US005907286A

United States Patent [19]

Kuma

[11] Patent Number: 5,907,286

[45] **Date of Patent: *May 25, 1999**

[54] TRANSPORT CONTAINER AND TRANSPORT CONTAINER MANAGING SYSTEM

[75] Inventor: Tatsuya Kuma, Kawasaki, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/521,425

[22] Filed: Aug. 30, 1995

[30] Foreign Application Priority Data

Feb. 15, 1995 [JP] Japan .................................... 7-026910

[51] Int. Cl.[6] .............................. G06F 7/00; H01H 27/00

[52] U.S. Cl. ................................ 340/825.31; 340/825.34; 340/988; 340/989; 902/4; 902/5; 902/9; 902/27; 235/379; 235/380; 235/382; 70/63

[58] Field of Search ......................... 340/825.31, 825.32, 340/825.34, 988, 989, 568, 573; 235/379, 380, 382; 902/4, 5, 9, 27, 39; 70/63; 220/1.5

[56] References Cited

U.S. PATENT DOCUMENTS

| | | | |
|---|---|---|---|
| 3,792,493 | 2/1974 | Hughes | 346/20 |
| 4,750,197 | 6/1988 | Denekamp et al. | 379/58 |
| 4,835,533 | 5/1989 | Akutsu | 340/825.31 |
| 4,868,409 | 9/1989 | Tanaka et al. | 307/10.5 |
| 5,508,691 | 4/1996 | Castleman et al. | 340/825.31 |

FOREIGN PATENT DOCUMENTS

| | | |
|---|---|---|
| 5-149048 | 6/1993 | Japan . |

*Primary Examiner*—Michael Horabik
*Assistant Examiner*—Yonel Beaulieu
*Attorney, Agent, or Firm*—Nikaido Marmelstein Murray & Oram, LLP

[57] ABSTRACT

A transport container and a transport container managing system are suitable for use for security management when valuable goods are transported by a transportation service. A transport container, which is closed in a condition that goods are housed therein and lock by the key mechanism upon transportation, has a key driving unit for switching a lock/unlock condition of the key mechanism by driving the key mechanism, a storage unit for storing, in advance, position information of a destination of the transportation where the key mechanism is unlocked, a position detecting unit for detecting a present position, a position collating unit for collating the position information of the destination of the transportation stored in the storage unit with present position information detected by the position detecting unit upon an operation to unlock the key mechanism to determine whether these two sorts of position information are in agreement or not, and an unlock directing unit for directing the key driving unit to unlock the key mechanism if the position collating unit determines that the position information of the destination of the transportation and the present position information are in agreement, thereby performing an unlocking operation under a specific condition so that the security of the transported goods may be improved.

55 Claims, 23 Drawing Sheets

TRANSPORT CONTAINER AND TRANSPORT CONTAINER MANAGING SYSTEM

BACKGROUND OF THE INVENTION

The present invention relates to a transport container and a transport container managing system suitable for use for security management in a transportation service by a banking facility, delivery service company, etc. when valuable goods such as money or articles are transported.

In general, when a banking facility transports cash, the cash is housed in a safe, and the safe is locked and loaded on a cash transporting vehicle to be transported to a predetermined place. In a transportation business such as a delivery service, transported goods are loaded on a delivery van to be transported to a predetermined place, as well.

In recent years, there has been a lot of crime as represented by an attack or a robbery on a cash transporting vehicle on duty during transportation of cash by a banking facility or a delivery van on duty during transportation of goods by a delivery service company. For this, there is a demand for an establishment of a transport container managing system as a security managing system for transported goods during transportation thereof by a vehicle on duty.

In a general transport container managing system applied to transportation of cash, when cash is loaded on a cash transporting vehicle and the vehicle comes and goes between the banking facilities to transport the cash, a route for the transportation or a time of the transportation is altered indeterminately, and in addition information about it is kept secret.

Further, during the transportation or at an arrival, a confirmation is made with a security guard company on a radio or the like and in addition the door of the cash transporting vehicle and the case are locked, thereby ensuring security for the transportation service.

However, only a physical lock is provided in the door of a cash transporting vehicle or a case in a general transport container managing system. Only the guard (a transporter while guarding) or the bank clerk possesses a key for the lock in order to ensure security. If someone hijacks the cash transporting vehicle or robbers the case on the vehicle, the lock can be easily opened.

In addition, there has been no way of tracking the cash transporting vehicle. If the cash transporting vehicle is hijacked, it is impossible to locate the cash transport vehicle.

SUMMARY OF THE INVENTION

To overcome the above problems, an object of the present invention is to provide a transport container and a transport container managing system in which a means for detecting position information about transported goods is provided and an unlocking control is performed under a predetermined condition so as to improve the security thereof.

The present invention therefore provides a transport container closed when goods are housed therein and locked by a key mechanism upon transportation comprising a key driving means for switching a lock/unlock condition of said key mechanism by driving said key mechanism, a storage means for storing in advance position information about a destination of the transportation where said key mechanism is unlocked, a position detecting means for detecting a present position, a position collating means for collating said position information about the destination of the transportation stored in said storage means with present position information detected by said position detecting means to determine whether these two sorts of position information are in agreement upon an operation to unlock said key mechanism, and an unlock directing means for directing said key driving means to unlock said key mechanism if said position collating means determines that the position information of the destination of the transportation agrees with said present position information.

The transport container of this invention may have a transmitting means for transmitting destination arrival information, which is attached to said present position information, to a host apparatus if said position collating means determines that the position information of the destination of the transportation agrees with said present position information.

The transport container of this invention may have an alarming means for generating an alarm and a transmitting means for transmitting alarm information to the host apparatus if said position collating means determines that the position information of the destination of the transportation disagrees with said present position information.

The transport container of this invention may have a receiving means for receiving said position information of the destination of the transportation from the host apparatus before a start of the transportation, and said position information of the destination of the transportation from said host apparatus received by said receiving means may be entered and stored in said storage means.

The transport container of this invention may have a receiving means for receiving an unlock command giving a direction to unlock said key mechanism from said host apparatus upon an operation to unlock said key mechanism, and an unlock command collating means for determining whether the unlock command from said host apparatus received by said receiving means is correct, and said unlock directing means may direct said key driving means to unlock said key mechanism if said position collating means determines that said position information of the destination of the transportation agrees with said present position information and said unlock command collating means determines that said unlock command is correct.

The transport container of this invention may have a transmitting means for transmitting abnormal information to said host apparatus if said unlock command collating means determines that said unlock command is incorrect.

The transport container of this invention may have a receiving means for receiving password information for collation necessary when said key mechanism is unlocked from the host apparatus, a password information input means for inputting password information for unlocking said key mechanism, and a password information collating means for collating said password information for collation received by said receiving means with input password information input through said password information input means to determine whether these two sorts of password information are in agreement upon an operation to unlock said key mechanism, and said unlock directing means may direct said key driving means to unlock said key mechanism if said position collating means determines that said position information of the destination of the transportation agrees with said present position information, and said password information collating means determines that said password information for collation agrees with said input password information.

The transport container of this invention may have an alarming means for generating an alarm and a transmitting means for transmitting alarm information to said host apparatus if said password information collating means determines that said password information for collation disagrees with said input password information.

According to the transport container of this invention, the position detecting means detects a present position of the transported goods, and the unlock directing means directs the key mechanism to be unlocked if the position collating means concludes there is agreement in the position information as a result of a collation. If the judgement by the position collating means results in a disagreement, an alarm may be generated, and in addition alarm information may be transmitted to the host apparatus. In consequence, it is impossible to unlock the key mechanism unless the position information of the destination of the transportation stored in advance and a place where the key mechanism is unlocked agree with each other. If someone fraudulently obtains the transported goods and tries to open the lock, it is possible to prevent it. This invention may therefore improve the security of the transported goods.

According to the transport container of this invention, it is impossible to unlock the key mechanism of the transport container without receiving an unlock command from the host apparatus. If the position detecting means fails, the security of the transported. goods may be ensured. According to this invention, there are set conditions required to unlock the key mechanism that position collation performed at both the transport container and the host apparatus result in agreement and a collation of the unlock command from the host apparatus results in the unlock command being correct. This invention may therefore increase not only a reliability of a determination of a position collation but also a reliability of the security of the transported goods because the double conditions required to unlock the key mechanism are set.

According to the transport container of this invention, it is impossible to unlock the key mechanism of the transport container without receiving password information from the host apparatus. Even if the position detecting means fails, the security of the transported goods may be ensured. According to this invention, there are set conditions required to unlock the key mechanism that double position collations performed by both the transport container and the host apparatus result in agreement and a collation of the password information from the host apparatus results in an agreement. This invention may therefore increase not only a reliability of a determination of a position collation but also a reliability of the security of the transported goods because the double conditions required to unlock the key mechanism are set.

The present invention also provides a transport container managing system having a transport container closed in a condition where goods are housed therein and locked by a key mechanism upon transportation and a host apparatus for managing said transport container comprising said transport container comprising a receiving means for receiving management information from said host apparatus, a transmitting means for transmitting information about said transport container to said host apparatus, a key driving means for switching a lock/unlock condition of said key mechanism by driving said key mechanism, a storage means for storing, in advance, position information about a destination of a transportation of said transport container where said key mechanism is unlocked, a position detecting means for detecting a present position of said transport container, a position collating means for collating said position information of the destination of the transportation stored in said storage means with present position information detected by said position detecting means upon an operation to unlock said key mechanism to determine whether these two sorts of position information are in agreement, an unlock directing means for directing said key driving means to unlock said key mechanism if said position collating means determines that said position information of the destination of the transportation agrees with said present position information, said host apparatus comprising a central storage means for storing management data for said transport container, a transmitting means on a side of said host apparatus for transmitting management information for managing said transport container to said transport container, and a receiving means on the side of said host apparatus for receiving information about said transport container from said transport container, before transportation of said transport container starts, said transmitting means on the side of said host apparatus of said host apparatus transmitting said position information about the destination about the transportation stored as said management data in said central storage means to said transport container as said management information, in said transport container, said position information about the destination of the transportation received as said management information from said host apparatus by said receiving means being entered and stored in said storage means of said transport container, in said transport container, said transmitting means transmitting destination arrival information, which is attached to said present position information, to said host apparatus upon an operation to unlock said key mechanism if said position collating means determines that said position information about the destination of the transportation agrees with said present position information.

In the transport container managing system of this invention, said transport container may have an alarming means for generating an alarm if said position collating means determines that said position information about the destination of the transportation disagrees with said present position information.

In the transport container of the transport container managing system of this invention, said transmitting means transmits alarm information to said host apparatus if said position collating means determines that said position information about the destination of the transportation disagrees with said present position information. On the other hand, said host apparatus may have a reporting means for reporting an occurrence of an emergency to a department concerned therewith when said receiving means on the side of said host apparatus receives said alarm information from said transport container.

In the transport container managing system of this invention, said host apparatus may have a position collating means on the side of said host apparatus for collating said present position information, which is attached to said destination arrival information received from said transport container by said receiving means on the side of said host apparatus, with said position information of the destination of the transportation stored as said management data in said central storage means to determine whether these two sorts of position information are in agreement. If said position collating means on the side of said host apparatus determines that said present position information agrees with said position information of the destination of the transportation, said transmitting means on the side of said host apparatus transmits an unlock command giving a direction to unlock said key mechanism of said transport container as said management information to said transport container. Said transport container may have an unlock command collating means for determining whether said unlock command received as said management information from said host apparatus by said receiving means on the side of said host apparatus is correct. If said position collating means determines that said position information about the destination of the transportation agrees with said present position information, and said unlock command collating means determines that said unlock command is correct, said unlock directing means may direct said key driving means to unlock said key mechanism.

In said transport container of the transport container managing system of this invention, if said unlock command collating means determines that said unlock command is incorrect, said transmitting means transmits abnormal information to said host apparatus. Said host apparatus may have a counting means for counting the number of times of receipt of said abnormal information from said transport container by said receiving means on the side of said host apparatus, a comparing means for comparing a counted value obtained by said counting means with a predetermined value, and a reporting means for reporting an occurrence of an emergency to a department concerned therewith if said comparing means determines that said counted value has reached said predetermined value. If said comparing means determines that said counted value is below said predetermined value, said transmitting means on the side of said host apparatus may transmit again the unlock command giving a direction to unlock said key mechanism as said management information to said transport container.

In this case, in said host apparatus, if said comparing means determines that said counted value has reached said predetermined value, said transmitting means on the side of said host apparatus transmits an alarm command directing an alarm operation as said management information to said transport container. Said transport container may have an alarming means for generating an alarm if said receiving means receives said alarm command as said management information from said host apparatus.

In the transport container managing system of this invention, said host apparatus may have a position collating means on the side of said host apparatus for collating said present position information, which is attached to said destination arrival information received from said transport container by said receiving means on the side of said host apparatus, with said position information about the destination of the transportation stored as said management data in said central storage means to determine whether these two sorts of position information are in agreement. If said position collating means on the side of said host apparatus determines that said present position information agrees with said position information of the destination of the transportation, said transmitting means on the side of said host apparatus transmits password information for collation necessary when said key mechanism of said transport container is unlocked as said management information to said transport container. Said transport container may have a password information input means for inputting password information for unlocking said key mechanism, and a password information collating means for collating said password information for collation received as said management information from said host apparatus by said receiving means with input password information input through said password information input means upon an operation to unlock said key mechanism to determine whether these two sorts of password information are in agreement. If said position collating means determines that said position information of the destination of the transportation agrees with said present position information and said password information collating means determines that said password information for collation agrees with said input password information, said unlock directing means may direct said key driving means to unlock said key mechanism.

In this case, said transport container may have an alarming means for generating an alarm if said password information collating means determines that said password information for collation disagrees with said input password information. In said transport container, if said password information collating means determines that said password information for collation disagrees with said input password information, said transmitting means transmits abnormal information to said host apparatus. On the other hand, said host apparatus may have a reporting means for reporting an occurrence of an emergency to a department concerned therewith when said receiving means on the side of said host apparatus receives said alarm information from said transport container.

According to the transport container managing system of this invention, the position detecting means detects a present position of the transported goods, and the unlock directing means directs to unlock the key mechanism if the position collating means concludes an agreement of the position information as a result of a collation. If the determination by the position collating means results in a disagreement, an alarm may be generated, and in addition alarm information may be transmitted to the host apparatus. In consequence, it is impossible to unlock the key mechanism unless the position information of the destination of the transportation, which is stored in advance, and a place where the key mechanism is unlocked agree with each other. If someone fraudulently obtains the transported goods and tries to open the lock, it is possible to prevent it. This invention may therefore improve the security of the transported goods.

According to the transport container managing system of this invention, it is impossible to unlock the key mechanism of the transport container without receiving an unlock command from the host apparatus. If the position detecting means fails, the security of the transported goods may be ensured. According to this invention, there are set conditions required to unlock the key mechanism that position collations performed doubly on the sides of both the transport container and the host apparatus result in agreements and a collation of the unlock command from the host apparatus results in the unlock command being correct. This invention may therefore increase not only a reliability of a determination of a position collation but also increase a reliability of the security of the transported goods because double conditions are required to unlock the key mechanism.

According to the transport container managing system of this invention, it is impossible to unlock the key mechanism of the transport container without receiving password information from the host apparatus. Even if the position detecting means fails, the security of the transported goods may be ensured. According to this invention, there are set conditions required to unlock the key mechanism such that double position collations performed on the sides of both the transport container and the host apparatus result in agreements and a collation of the password information from the host apparatus results in an agreement. This invention may therefore increase not only the reliability of a determination about a position collation but also a reliability of the security of the transported goods because double conditions are required to unlock the key mechanism.

The present invention also provides a transport container managing system having a transport container closed in a condition where goods are housed therein and locked by a key mechanism upon transportation and a host apparatus for managing said transport container comprising said transport container comprising a receiving means for receiving management information from said host apparatus, a transmitting means for transmitting information about said transport container to said host apparatus. a key driving means for switching an lock/unlock condition of said key mechanism by driving said key mechanism, a position detecting means for detecting a present position of said transport container, an unlock command collating means for determining whether an unlock command is correct when said receiving means receives the unlock command giving a direction to unlock said key mechanism from said host apparatus, an unlock directing means for directing said key driving means to unlock said key mechanism if said unlock command collating means determines that said unlock command is correct, when said transport container gets to a destination, said transmitting means transmitting destination arrival information, which is attached to said present position information detected by said position detecting means, to said host apparatus, said host apparatus comprising a central storage means for storing management data about said transport container, a transmitting means on the side of said host apparatus for transmitting management information for managing said transport container to said transport container, a receiving means on the side of said host apparatus for receiving information about said transport container from said transport container, and a position collating means on the side of said host apparatus for collating said present position information, which is attached to said destination arrival information received from said transport container by said receiving means on the side of said host apparatus, with said position information about the destination of the transportation stored as said management data in said central storage means to determine whether these two sorts of position information are in agreement, if said position collating means on the side of said host apparatus determines that said present position information agrees with said position information about the destination of the transportation, said transmitting means on the side of said host apparatus transmitting an unlock command giving a direction to unlock said key mechanism of said transport container as said management information to said transport container.

In said transport container of the transport container managing system of this invention, if said unlock command collating means determines that said unlock command is incorrect, said transmitting means transmits abnormal information to said host apparatus. Said host apparatus may have a counting means for counting the number of times of receipt of said abnormal information from said transport container by said receiving means on the side of said host apparatus, a comparing means for comparing a counted value obtained by said counting means with a predetermined value, and a reporting means for reporting an occurrence of an emergency to a department concerned therewith if said comparing means determines that said counted value has reached said predetermined value. If said comparing means determines that said counted value is below said predetermined value, said transmitting means on the side of said host apparatus transmits again the unlock command giving a direction to unlock said key mechanism as said management information to said transport container.

In said host apparatus of the transport container managing system of this invention, if said comparing means determines that said counted value has reached said predetermined value, said transmitting means on the side of said host apparatus transmits an alarm command directing an alarming operation as said management information to said transport container. Said transport container may have an alarming means for generating an alarm if said receiving means receives said alarm command as said management information from said host apparatus.

According to the transport container managing system of this invention, it is impossible to unlock the key mechanism without receiving the correct unlock command from the host apparatus. It is thus possible to manage command information used to unlock the key mechanism for each transport container, and ensure the security of the transported goods even if the position detecting means fails, for example.

According to the transport container managing system of this invention, the transport container may receive the unlock command from the host apparatus for a predetermined number of times until a correct unlock command is input. If a correct unlock command is input before the number of times of receipt of the unlock command reaches a predetermined number of times, it is possible to unlock the key mechanism. It is thus possible to prevent the host apparatus and the alarming means of the transport container from erroneously giving an emergency alarm.

The present invention also provides a transport container managing system having a transport container closed when where goods are housed therein and locked by a key mechanism upon transportation and a host apparatus for managing said transport container comprising said transport container comprising a receiving means for receiving management information from said host apparatus, transmitting means for transmitting information about said transport container to said host apparatus, a key driving means for switching a lock/unlock condition of said key mechanism by driving said key mechanism, a position detecting means for detecting a present position of said transport container, a password information input means for inputting password information for unlocking said key mechanism, a password information collating means for collating password information for collation with input password information input from said password information input means when said receiving means receives said password information for collation necessary when said key mechanism is unlocked from said host apparatus to determine whether these two sorts of password information are in agreement, an unlock directing means for directing said key driving means to unlock said key mechanism if said password information collating means determines that said password information for collation agrees with said input password information, when said transport container gets to a destination, said transmitting means transmitting destination arrival information, which is attached to said present position information detected by said position detecting means, to said host apparatus, said host apparatus comprising a central storage unit for storing management data of said transport container, a transmitting means on the side of said host apparatus for transmitting management information for managing said transport container to said transport container, a receiving means on the side of said host apparatus for receiving information about said transport container from said transport container, and a position collating means on the side of said host apparatus for collating said present position information attached to said destination arrival information received from said transport container by said receiving means on the side of said host apparatus with said position information about the destination of the transportation stored as the management data in said central storage means to determine whether these two sorts of information are in agreement, if said position collating means on the side of said host apparatus determines that said present position information agrees with said position information about the destination of the transportation, said transmitting means on the side of said host apparatus transmitting password information for collation necessary when said key mechanism of said transport container is unlocked as said management information to said transport container.

In the transport container managing system of this invention, said transport container may have an alarming means for generating an alarm if said password information collating means determines that said password information for collation disagrees with said input password information.

In said transport container of the transport container managing system of this invention, if said password information collating means determines that said password information for collation disagrees with said input password information, said transmitting means transmits abnormal information to said host apparatus. On the other hand, said host apparatus may have a reporting means for reporting an occurrence of an emergency to a department concerned therewith if said receiving means on the side of said host apparatus receives said alarm information from said transport container.

In the transport container managing system of this invention, the transmitting means on the side of the host apparatus may transmit, on occasion, a position confirm command demanding a transmission of position information about the transport container during transportation as management information to the transport container. In the transport container, when the receiving means receives the position confirm command as the management information, the transmitting means may transmit present position information about the transport container during the transportation detected by the position detecting means to the host apparatus.

The transport container managing system of this invention may have an alarming means for generating an alarm and a transmitting means for transmitting alarm information to said host apparatus if said password information collating means determines that said password information for collation disagrees with said input password information.

Accordingly, the transport container managing system of this invention may perform an unlocking control on the key mechanism on a condition that a collation of the password information entered in advance with the password information input from the transport container results in an agreement. It is therefore possible to manage the password information used to unlock the key mechanism for each transport container. It is also possible to ensure the security of the transported goods even if the position detecting means fails since the key mechanism of the transport container cannot be unlocked without receiving the password information from the host apparatus.

According to the transport container managing system of this invention, the host apparatus may recognize present position information of the transport container during a transportation. If the transport container encounters a robbery, it is thus possible to detect a position of the stolen transport container.

The present invention also provide a transport container which is closed when goods are housed therein and locked by a key mechanism upon transportation comprising a key driving means for switching a lock/unlock condition of said key mechanism by driving said key mechanism, a receiving means for receiving an unlock command giving a direction to unlock said key mechanism from said host apparatus upon an operation to unlock said key mechanism, and an unlock command collating means for determining whether the unlock command from said host apparatus received by said receiving means is correct, and an unlock directing means for directing said key driving means to unlock said key mechanism if said unlock command collating means determines that said unlock command is correct.

According to the transport container of this invention, the receiving means of the transport container receives an unlock command or password information for collation from the host apparatus. On a condition required to unlock the key mechanism such that the unlock command is correct or a collation of the password information for collation results in an agreement, the security of the transported goods may be, at least, ensured. According to the above embodiment, there is no need to enter, in advance, position information about a destination of a transportation.

The present invention also provide a transport container which is closed when goods are housed therein and locked by a key mechanism upon transportation comprising a key driving means for switching a lock/unlock condition of said key mechanism by driving said key mechanism, a receiving means for receiving password information for collation necessary when said key mechanism is unlocked from a host apparatus, a password information input means for inputting password information for unlocking said key mechanism, a password information collating means for collating said password information for collation received by said receiving means with said input password information input through said password information input means upon an operation to unlock said key mechanism to determine whether these two sorts of password information are in agreement, and an unlock directing means for directing said key driving means to unlock said key mechanism if said password information collating means determines that said password information for collation agrees with said input password information.

According to the transport container of this invention, the receiving means of the transport container receives an unlock command or password information for collation. On a condition required to unlock the key mechanism such that a the unlock command is correct or a collation of the password information for collation results in an agreement, the security of the transported goods may be, at least, ensured. According to this embodiment, there is no need to enter, in advance, position information about a destination of transportation.

Figure 1:
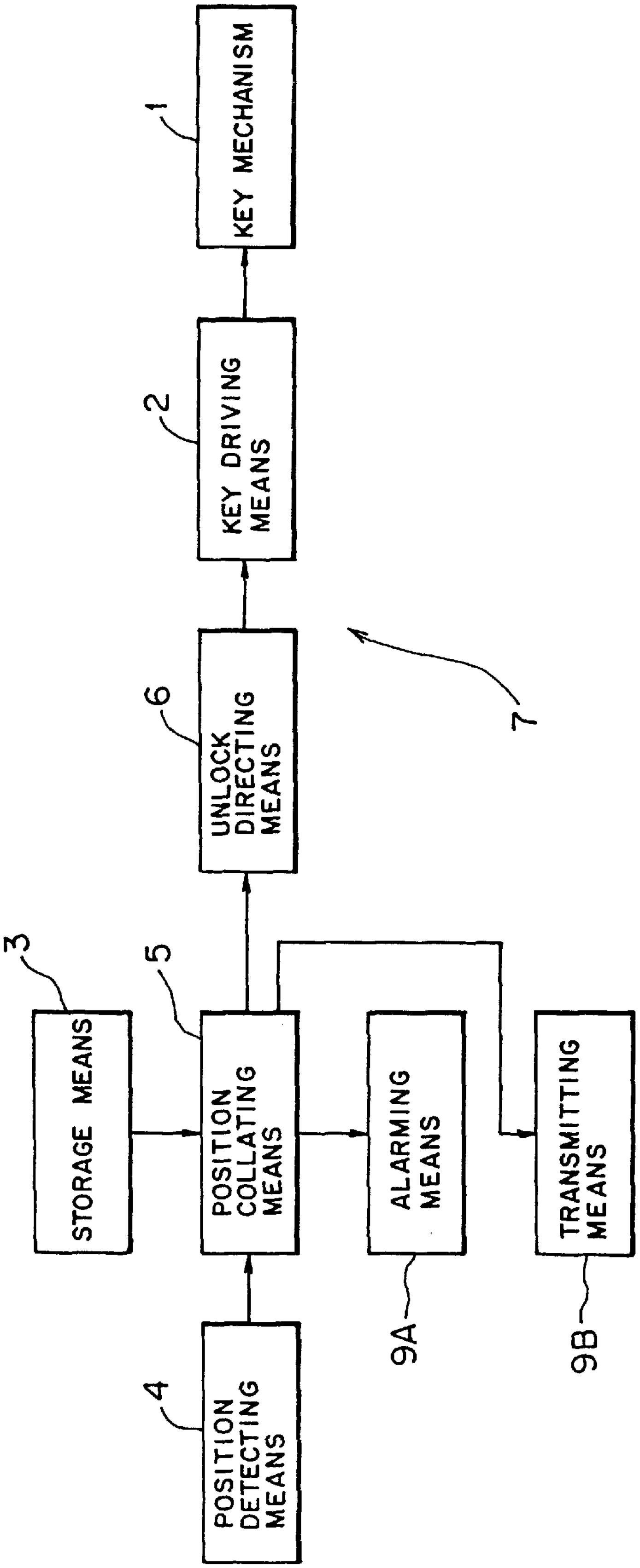
FIG. 1 is a block diagram showing a first aspect of this invention.

DESCRIPTION OF THE PREFERRED EMBODIMENT (a) Description of Aspect of the Invention Now, a description will be made of aspects of this invention referring to the drawings.

FIG. 1 is a block diagram showing a first aspect of this invention. In FIG. 1, reference numeral 7 denotes a transport container. The transport container is closed when goods are housed in the transport container 7 and locked by a key mechanism 1 upon transportation.

The transport container 7 has a key driving means 2, a storage means 3, a position detecting means 4, a position collating means 5 and an unlock directing means 6, in addition to the key mechanism 1.

The key driving means 2 switches a lock/unlock condition of the key mechanism 1 by driving the key mechanism 1. The storage means 3 stores, in advance, position information about a destination of a transportation where the key mechanism 1 is unlocked. The position detecting means 4 detects a present position.

The position collating means 5 collates the position information of the destination of the transportation stored in the storage means 3 with present position information detected by the position detecting means 4 to determine whether these two sorts of position information are in agreement or not upon an operation to unlock the key mechanism 1.

The unlock directing means 6 directs the key driving means 2 to unlock the key mechanism 1 if the position collating means 5 determines that the position information of the destination of the transportation agrees with the present position information.

The transport container 7 may include a transmitting means for transmitting destination arrival information, which is attached to the present position information, to a host apparatus if the position collating means 5 determines that the position information of the destination of the transportation agrees with the present position information.

The transport container 7 may also include an alarming means 9A for generating an alarm and a transmitting means 9B for transmitting alarm information to the host apparatus if the position collating means 5 determines that the position information of the destination of the transportation disagrees with the present position information.

The transport container 7 may also include a receiving means for receiving the position information of the destination of the transportation from the host apparatus before a start of the transportation. The position information of the destination of the transportation received by the receiving means from the host apparatus may be entered and stored in the storage means 3.

The transport container 7 has the receiving means for receiving an unlock command giving a direction to unlock the key mechanism 1 from the host apparatus upon an operation to unlock the key mechanism 1, and an unlock command collating means for determining whether the unlock command received from the host apparatus by the receiving means is correct or not. If the position collating means 5 determines that the position information of the destination of the transportation agrees with the present position information, and the unlock command collating means determines or judges that the unlock command is correct, the unlock directing means 6 directs the key driving means 2 to unlock the key mechanism 1. The transport container 7 may include a transmitting means for transmitting abnormal information to the host apparatus if the unlock command is determined to be incorrect.

If the transport container 7 includes a receiving means for receiving password information for collation necessary when the key mechanism 1 is unlocked from the host apparatus, a password information input means for inputting password information for unlocking the key mechanism 1, and a password information collating means for collating the password information for collation received by the receiving means with the password information input through the password information input means upon an operation to unlock the key mechanism 1 to determine whether these two sorts of password information are in agreement or not, the unlock directing means 6 directs the key driving means 2 to unlock the key mechanism 1 if the position collating means 5 determines that the position information of the destination of the transportation agrees with the present position information and the password information collating means determines that the password information for collation agrees with the input password information.

The transport container 7 may include an alarming means for generating an alarm and a transmitting means for transmitting alarm information to the host apparatus, if the password collating means determines that the password information for collation does not agree with the input password information.

In the above transport container 7 shown in FIG. 1, the unlock directing means 6 directs the key driving means 2 to unlock the key mechanism 1 if the position collating means 5 collates the position information of the destination of the transportation stored in the storage means 3 with the present position information detected by the position detecting means 4 to determine whether these two sorts of position information are in agreement or not upon an operation to unlock the key mechanism 1, and concludes that the position information of the destination of the transportation agrees with the present position information. Further, the transmitting means may transmit the destination arrival information which is attached to the present position information to the host apparatus.

If the position collating means 5 determines that the position information of the destination of the transportation does not agree with the present position information, the alarming means 9A may generate an alarm and the transmitting means 9B may transmit alarm information to the host apparatus.

The receiving means may receive the position information of the destination of the transportation from the host apparatus before a start of the transportation. The position information of the destination of the transportation from the host apparatus received by the receiving means may be entered and stored in the storage means 3.

The unlock command collating means determines whether an unlock command received from the host apparatus through the receiving means is correct or not. If the position collating means 5 determines that the position information of the destination of the transportation agrees with the present position information, and the unlock command collating means determines that the unlock command is correct, the unlock directing means 6 directs the key driving means 2 to unlock the key mechanism 1. If the unlock command is determine to be incorrect, the transmitting means may transmit abnormal information to the host apparatus.

The password information collating means collates the password information for collation received by the receiving means with the input password information input through the password information input means upon an operation to unlock the key mechanism 1 to determine whether these two sorts of password information are in agreement or not. If the position collating means 5 determines that the position information of the destination of the transportation agrees with the present position information, and the password information collating means determines that the password information for collation agrees with the input password information, the unlock directing means 6 directs the key driving means 2 to unlock the key mechanism 1.

If the password information collating means determines that the password information for collation does not agree with the input password information, the alarming means may generate an alarm, and in addition the transmitting means may transmit alarm information to the host apparatus.

According to the transport container of this invention, the position detecting means 4 detects a present position of the transported goods, and the unlock directing means 6 directs to unlock the key mechanism 1 if the position collating means 5 concludes an agreement of the position information as a result of a collation. If the determination by the position collating means 5 results in a disagreement, an alarm may be generated, and in addition alarm information may be transmitted to the host apparatus. In consequence, it is impossible to unlock the key mechanism 1 unless the position information of the destination of the transportation which is stored in advance and a place where the key mechanism 1 is unlocked agree with each other. If someone fraudulently obtains the transported goods and tries to open the lock, it is possible to prevent it. This invention may therefore improve the security of the transported goods.

According to the transport container of this invention, it is impossible to unlock the key mechanism 1 of the transport container without receiving an unlock command from the host apparatus. If the position detecting means 4 fails, the security of the transported goods may be ensured. According to this invention, there are set conditions required to unlock the key mechanism 1 that position collations, performed doubly on the sides of both the transport container and the host apparatus, result in agreements and a collation of the unlock command from the host apparatus results in that the unlock command is correct. This invention may therefore increase not only a reliability of a determination of a position collation but also a reliability of the security of the transported goods because double conditions are required to unlock the key mechanism 1.

According to the transport container of this invention, it is impossible to unlock the key mechanism 1 of the transport container without receiving password information from the host apparatus. If the position detecting means 4 fails, the security of the transported goods may be ensured. According to this invention, there are set conditions required to unlock the key mechanism 1 that double position collations performed on the sides of both the transport container and the host apparatus result in agreements and a collation of the password information from the host apparatus results in an agreement. This invention may therefore increase not only a reliability of a determining of a position collation but also a reliability of the security of the transported goods because double conditions are required to unlock the key mechanism 1.

Figure 2:
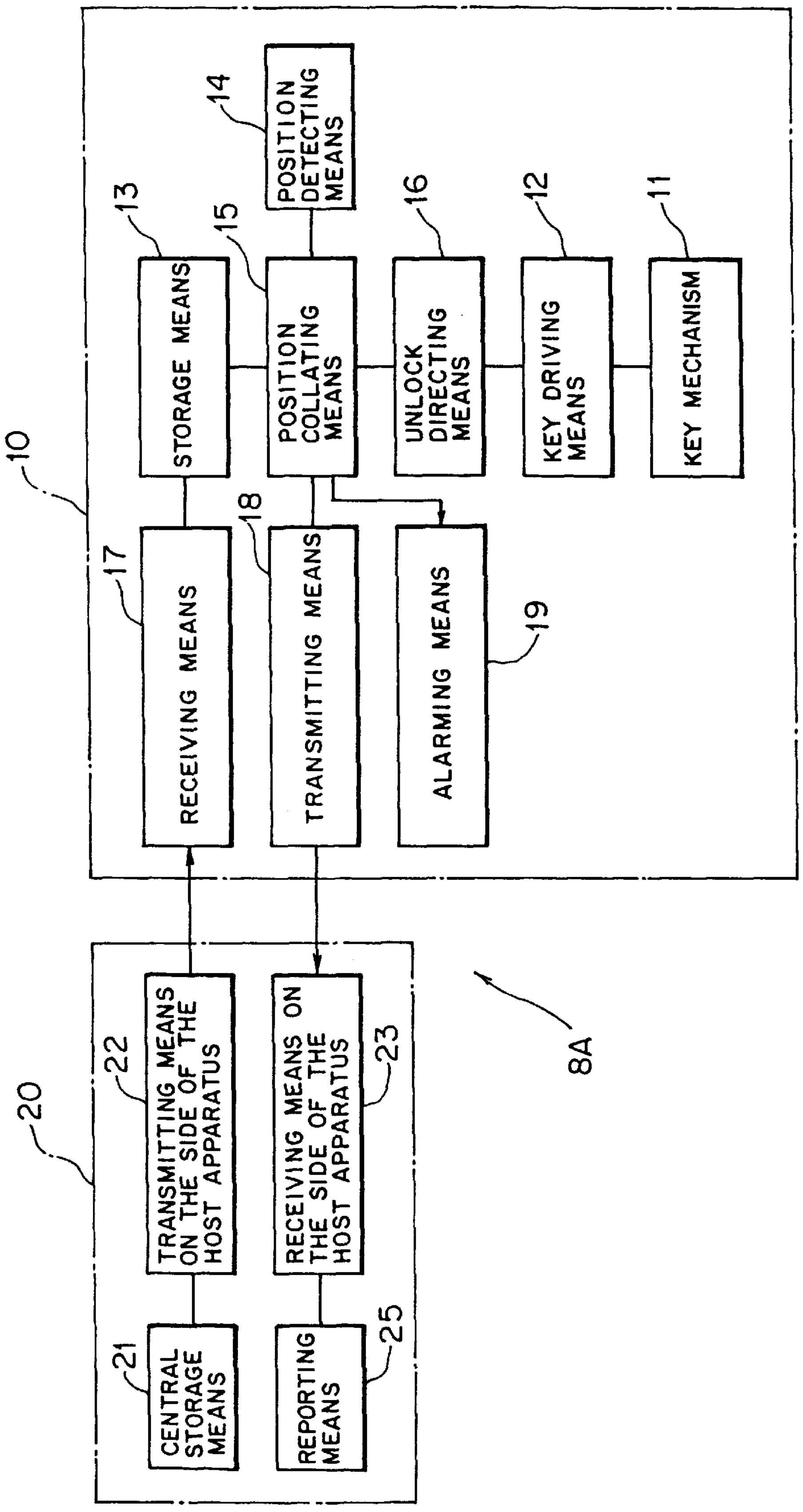
FIG. 2 is a block diagram showing a second aspect of this invention.

FIG. 2 is a block diagram showing a second aspect of this invention. In FIG. 2, reference numeral 8A denotes a transport container managing system. The transport container managing system 8A has a transport container 10 which is closed when goods are housed therein and locked by a key mechanism 11 upon transportation, and a host apparatus 20 for managing the transport container 10.

The transport container 10 has a receiving means 17, a transmitting means 18, a key driving means 12, a storage means 13, a position detecting means 14, a position collating means 15 and an unlock directing means 16, in addition to the key mechanism 11. On the other hand, the host apparatus 20 has a central storage means 20, a transmitting means on the side of the host apparatus 22, and a receiving means on the side of the host apparatus 23.

The receiving means 17 receives management information from the host apparatus 20. The transmitting means 18 transmits information about the transport container 10 to the host apparatus 20.

The key driving means 12 drives the key mechanism 11 to switch a lock/unlock condition of the key mechanism 11. The storage means 13 stores, in advance, position information about a destination of the transport container 10 where the key mechanism 11 is unlocked. The position detecting means 14 detects a present position of the transport container 10.

The position collating means 15 collates the position information of the destination of the transportation stored in the storage means 13 with the present position information detected by the position detecting means 14 to determine whether these two sorts of position information are in agreement or not upon an operation to unlock the key mechanism 11.

The unlock directing means 16 directs the key driving means 12 to unlock the key mechanism 11 if the position collating means 15 determines that the position information of the destination of the transportation and the present position information are in agreement.

The central storage means 21 of the host apparatus 20 stores management data for the transport container 10. The transmitting means on the side of the host apparatus 22 transmits the management information for managing the transport container 10 to the transport container 10. The receiving means on the side of the host apparatus 23 receives information about the transport container 10 from the transport container 10.

Before a start of transportation of the transport container 10, the transmitting means on the side of the host apparatus 22 of the host apparatus 20 transmits the position information about the destination of the transportation, which is stored as management data in the central storage means 21, to the transport container 10 as the management information, and, in the transport container 10, the position information about the destination of the transportation received by the receiving means 17 as the management information from the host apparatus 20 is entered and stored in the storage means 13 of the transport container 10. In the transport container 10, if the position collating means 15 determines that the position information of the destination of the transportation and the present position information are in agreement upon an operation to unlock the key mechanism 11, the transmitting means 18 transmits destination arrival information, which is attached to the present position information, to the host apparatus 20.

The transport container 10 may further have an alarming means 19 for generating an alarm if the position collating means 15 determines that the position information of the destination of the transportation and the present position information are in disagreement.

In the transport container 10, the transmitting means 18 transmits alarm information to the host apparatus if the position collating means 15 determines that the position information of the destination of the transportation and the present position information are in disagreement. On the other hand, the host apparatus 20 may have a reporting means 25 for reporting an occurrence of an emergency to a department concerned therewith if the receiving means on the side of the host apparatus 23 receives the alarm information from the transport container 10.

The host apparatus 20 has the position collating means on the side of the host apparatus for collating the present position information attached to the destination arrival information received from the transport container 10 by the receiving means on the side of the host apparatus 23 with the position information of the destination of the transportation stored as the management data in the central storage means 21 to determine whether these two sorts of position information are in agreement or not. If the position collating means on the side of the host apparatus determines that the present position information and the position information of the destination of the transportation are in agreement, the transmitting means on the side of the host apparatus 22 transmits an unlock command giving a direction to unlock the key mechanism 11 of the transport container 10 as the management information to the transport container 10. The transport container 10 has the unlock command collating means for determining whether the unlock command received as management information from the host apparatus 20 by the receiving means 17 is correct or not. If the position collating means determines that the position information of the destination of the transportation and the present position information are in agreement and the unlock command collating means determines that the unlock command is correct, the unlock directing means 16 directs the key driving means 12 to unlock the key mechanism 11.

In this case, in the transport container 10, if the unlock command collating means determines that the unlock command is incorrect, the transmitting means 18 transmits abnormal information to the host apparatus 20. The host apparatus 20 has a counting means for counting the number of times of receipt of the abnormal information from the transport container 10 by the receiving means on the side of the host apparatus 23, and a comparing means for comparing a counted value obtained by the counting means with a predetermined value, and a reporting means for reporting an occurrence of an emergency to the department concerned therewith if the comparing means determines that the counted value has reached the predetermined value. If the comparing means determines that the counted value does not exceed the predetermined value, the transmitting means on the side of the host apparatus 22 transmits again the unlock command giving a direction to unlock the key mechanism 11 as the management information to the transport container 10.

In the above case, in the host apparatus 20, if the comparing means determines that the counted value has reached the predetermined value, the transmitting means on the side of the host apparatus 22 transmits an alarm command directing an alarming operation as the management information to the transport container 10. The transport container 10 has the alarming means for generating an alarm if the receiving means 17 receives the alarm command as the management information from the host apparatus 20.

The host apparatus 20 has the position collating means on the side of the host apparatus for collating the present position information attached to the destination arrival information received from the transport container 10 by the receiving means on the side of the host apparatus 23 with the position information of the destination of the transportation stored as the management data in the central storage means 21 to determine whether these two sorts of position information are in agreement or not. If the position collating means on the side of the host apparatus determines that the present position information and the position information of the destination of the transportation are in agreement, the transmitting means on the side of the host apparatus 22 transmits password information for collation necessary when the key mechanism 11 of the transport container 10 is unlocked as the management information to the transport container 10. The transport container 10 has the password information input means for inputting password information for unlocking the key mechanism 11, and the password information collating means for collating the password information for collation received as the management information from the host apparatus 20 by the receiving means 17 with the input password information input through the password information input means upon an operation to unlock the key mechanism 11 to determine whether these two sorts of password information are in agreement or not. If the position collating means 15 determines that the position information of the destination of the transportation and the present position information are in agreement and the password information collating means determines that the password information for collation and the input password information are in agreement, the unlock directing means 16 directs the key driving means to unlock the key mechanism 11.

In this case, the transport container 10 may have the alarming means for generating an alarm if the password information collating means determines that the password information for collation and the input password information are in disagreement. Further, the transmitting means 18 transmits abnormal information to the host apparatus 20. The host apparatus 20 may have the reporting means for reporting an occurrence of an emergency to a department concerned therewith if the receiving means on the side of the host apparatus 23 receives the alarm information from the transport container 10.

In the transport container managing system shown in FIG. 2, before a start of a transportation of the transport container 10, the transmitting means on the side of the host apparatus 22 of the host apparatus 20 transmits position information of a destination of the transportation stored as management data in the central storage means 21 to the transport container 10 as the management information. In the transport container 10, the position information of the destination of the transportation received as the management information from the host apparatus 20 by the receiving means 17 is entered and stored in the storage means 13 of the transport container 10.

Upon an operation to unlock the key mechanism 11, the position collating means 15 collates the position information of the destination of the transportation stored in the storage means 13 with present position information detected by the position detecting means 14 to determine whether these two sorts of position information are in agreement or not. If the position collating means 15 determines that the position information of the destination of the transportation and the present position information are in agreement, the unlock directing means 16 directs the key driving means 12 to unlock the key mechanism 11. The transmitting means 18 transmits destination arrival information, which is attached to the present position information, to the host apparatus 20.

If the position collating means 15 determines that the position information of the destination of the transportation and the present position information are in disagreement, the alarming means 19 of the transport container 10 may generate an alarm, and the transmitting means 18 may transmit alarm information to the host apparatus 20. When the receiving means on the side of the host apparatus 23 receives the alarm information from the transport container 10, the reporting means 25 of the host apparatus 20 may report an occurrence of an emergency to the department concerned therewith.

Further, the position collating means on the side of the host apparatus 20 collates the present position information attached to the destination arrival information received from the transport container 10 by the receiving means on the side of the host apparatus 23 with the position information of the destination of the transportation stored as the management data in the central storage means 21 to determine whether these two sorts of position information are in agreement or not. If the position collating means on the side of the host apparatus determines that the present position information agrees with the position information of the destination of the transportation, the transmitting means on the side of the host apparatus 22 transmits an unlock command giving a direction to unlock the key mechanism 11 of the transport container 10 as the management information to the transport container 10. The unlock command collating means of the transport container 10 determines whether the unlock command received as the management information from the host apparatus 20 by the receiving means 17 is correct or not. If the position collating means determines that the position information of the destination of the transportation and the present position information are in agreement and the unlock command collating means determines that the unlock command is correct, the unlock directing means 16 directs the key driving means 12 to unlock the key mechanism 11.

In this case, in the transport container 10, if the unlock command collating means determines that the unlock command is incorrect, the transmitting means 18 transmits abnormal information to the host apparatus 20. The counting means of the host apparatus 20 counts the number of times of receipt of the abnormal information from the transport container 10 by the receiving means on the side of the host apparatus 23. The comparing means compares a counted value obtained by the counting means with a predetermined value. If the comparing means determines that the counted value has reached the predetermined value, the reporting means reports an occurrence of an emergency to the department concerned therewith. If the comparing means determines that the counted value does not exceed the predetermined value, the transmitting means on the side of the host apparatus 22 transmits again the unlock command giving a direction to unlock the key mechanism 11 as management information to the transport container 10.

In the above case, if the comparing means determines that the counted value has reached the predetermined value, the transmitting means on the side of the host apparatus 22 transmits an alarm command directing an alarming operation as the management information to the transport container 10. The alarming means of the transport container 10 generates an alarm if the receiving means 17 receives the alarm command as the management information from the host apparatus 20.

The position collating means on the side of the host apparatus in the host apparatus 20 collates the present position information attached to the destination arrival information received from the transport container 10 by the receiving means on the side of the host apparatus 23 with the position information of the destination of the transportation stored as the management data in the central storage means 21 to determine whether these two sorts of position information are in agreement or not. If the position collating means on the side of the host apparatus determines that the present position information and the position information of the destination of the transportation are in agreement, the transmitting means on the side of the host apparatus 22 transmits password information for collation necessary when the key mechanism 11 of the transport container 10 is unlocked as management information to the transport container 10. Password information used to unlock the key mechanism 11 is input through the password information input means of the transport container 10. The password information collating means of the transport container 10 collates the password information for collation received as the management information from the host apparatus 20 by the receiving means 17 with the input password information input through the password information input means to determine whether these two sorts of password information are in agreement or not upon an operation to unlock the key mechanism 11. If the position collating means 15 determines that the position information of the destination of the transportation and the present position information are in agreement and the password information collating means determines that the password information for collation and the input password information are in agreement, the unlock directing means 16 directs the key driving means to unlock the key mechanism 11.

In this case, the alarming means of the transport container 10 may generate an alarm if the password information collating means determines that the password information for collation and the input password information are in disagreement. The transmitting means 18 may transmit abnormal information to the host apparatus 20. The reporting means of the host apparatus 20 may report an occurrence of an emergency to the department concerned therewith if the receiving means on the side of the host apparatus 23 receives the alarm information from the transport container 10.

According to the transport container managing system of this invention, the position detecting means 14 detects a present position of the transported goods. If the position collating means 15 determines that a position information collation results in an agreement, the unlocking directing means 16 directs to unlock the key mechanism 11. If a result is disagreement, it is possible to give an alarm and transmit alarm information to the host apparatus as well. Unless the position information of the destination of the transportation, which is stored in advance, and the place where the key mechanism 11 is unlocked agree with each other, it is impossible to unlock the key mechanism 11. If someone fraudulently obtains the transported goods and tries to open the lock, it is therefore impossible to open it. This invention may thus improve the security of the transported goods.

According to the transport container managing system of this invention, it is impossible to unlock the key mechanism 11 of the transport container 10 without receiving the unlock command from the host apparatus 20. If the position detecting means 14 fails, for example, the security of the transported goods may be ensured. According to this invention, there are provided conditions required to unlock the key mechanism 11 that a double position collation performed on the sides of both the transport container 10 and the host apparatus 20 results in an agreement and a collation of the unlock command from the host apparatus 20 results when the unlock command is correct. This invention may therefore increase not only a reliability of a determination of the position collation but also a reliability of the security of the transported goods since the conditions to unlock the key mechanism 11 are doubly set.

According to the transport container managing system of this invention, it is impossible to unlock the key mechanism 11 of the transport container 10 without receiving password information from the host apparatus 20. If the position detecting means 14 fails, for example, the security of the transported goods may be ensured. According to this invention, there are provided conditions required to unlock the key mechanism 11 that a double position collation performed on the sides of both the transport container 10 and the host apparatus 20 results in an agreement and a collation of the password information from the host apparatus 20 results in an agreement. This invention may therefore increase not only the reliability of a determination of the position collation but also the reliability of the security of the transported goods since the conditions required to unlock the key mechanism 11 are doubly set.

Figure 3:
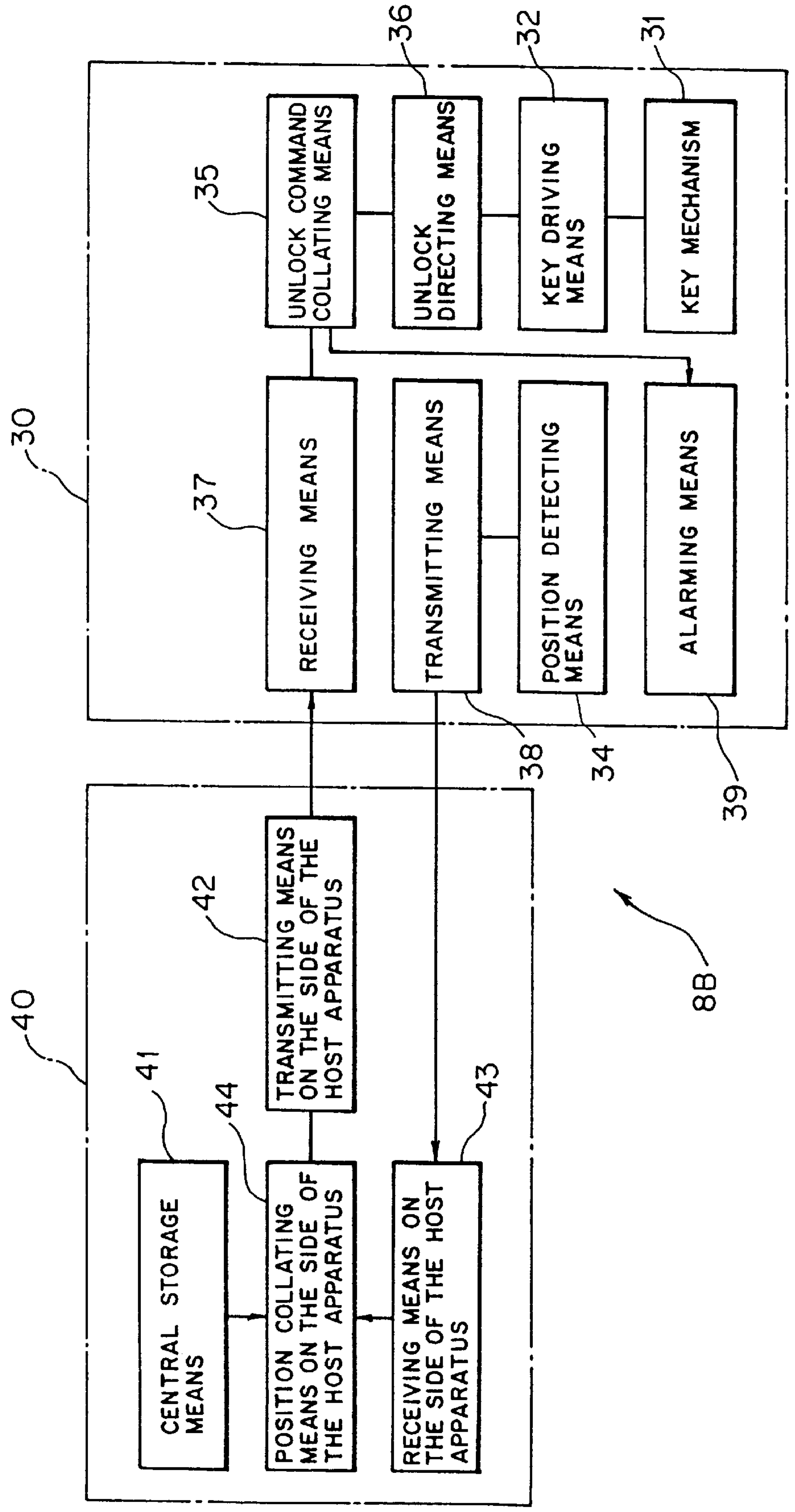
FIG. 3 is a block diagram showing a third aspect of this invention.

FIG. 3 is a block diagram showing a third aspect of this invention. In FIG. 3, reference numeral 8B denotes a transport container managing system. The transport container managing system 8B includes a transport container 30 which is closed when transported goods are housed therein and locked by a key mechanism 31 upon transportation, and a host apparatus 40 for managing the transport container 30.

The transport container 30 has a key driving means 32, a position detecting means 34, an unlock command collating means 35, an unlock directing means 36, a receiving means 37 and a transmitting means 38, in addition to the key mechanism 31.

Each of the key mechanism 31, the key driving means 32, the position detecting means 34 and the unlock directing means 36 of the transport container 30 has a function of the corresponding element of the transport container 10 described hereinbefore shown in FIG. 2 (refer to reference numerals 11, 12, 14 and 16).

The receiving means 37 receives management information from the host apparatus 40. The transmitting means 38 transmits information about the transport container 30 to the host apparatus 40.

In practice, the transmitting means 38 transmits destination arrival information, which is attached to present position information detected by the position detecting means 34, to the host apparatus 40 when the transport container 30 gets to a destination of the transportation.

The unlock command collating means 35 determines whether an unlock command is correct or not when the receiving means 37 receives the unlock command giving a direction to unlock the key mechanism 31 from the host apparatus 40. If the unlock command collating means 35 determines that the unlock command is correct, the unlock directing means 36 directs the key driving means 32 to unlock the key mechanism 31.

The host apparatus 40 has a central storage means 41, a transmitting means on the side of the host apparatus 42, a receiving means on the side of the host apparatus 43 and a position collating means on the side of the host apparatus 44.

The central storage means 41 stores management data of the transport container 30. The transmitting means on the side of the host apparatus 42 transmits the management information for managing the transport container 30 to the transport container 30. The receiving means on the side of the host apparatus 43 receives information about the transport container 30 from the transport container 30.

The position collating means on the side of the host apparatus 44 collates the present position information, which is attached to the destination arrival information received from the transport container 30 by the receiving means on the side of the host apparatus 43, with the position information of the destination of the transportation stored as the management data in the central storage means 41 to determine whether these two sorts of position information are in agreement or not.

If the position collating means on the side of the host apparatus 44 determines that the present position information and the position information of the destination of the transportation are in agreement, the transmitting means on the side of the host apparatus 42 transmits an unlock command giving a direction to unlock the key mechanism 31 of the transport container 30 as the management information to the transport container 30.

In the transport container 30, if the unlock command collating means 35 determines that the unlock command is not correct, the transmitting means 38 transmits abnormal information to the host apparatus 40. The host apparatus 40 includes a counting means for counting the number of times of receipt of the abnormal information from the transport container 30 by the receiving means on the side of the host apparatus 43, a comparing means for comparing a counted value obtained by the counting means number with a predetermined value, and a reporting means 45 for reporting an occurrence of an emergency to the department concerned therewith if the comparing means determines that the counted value has reached the predetermined value. If the comparing means determines that the counted value does not exceed the predetermined value, the transmitting means on the side of the host apparatus 42 may transmit again the unlock command giving a direction to unlock the key mechanism 31 as the management information to the transport container 30.

In this case, in the host apparatus 40, the transmitting means on the side of the host apparatus 42 may transmit an alarm command directing an alarming operation as the management information to the transport container 30 if the comparing means determines that the counted value has reached the predetermined value. The transport container 30 may include an alarming means 39 for generating an alarm if the receiving means 37 receives the alarm command as the management information from the host apparatus 40.

In the above transport container managing system shown in FIG. 3, the transmitting means 38 transmits the destination arrival information, which is attached to the present position information detected by the position detecting means 34, to the host apparatus 40 when the transport container 30 gets to the destination.

The position collating means on the side of the host apparatus 44 in the host apparatus 40 collates the present position information, which is attached to the destination arrival information received from the transport container 30 by the receiving means on the side of the host apparatus 43, with the position information of the destination of the transportation stored as the management data in the central storage means 41 to determine whether these two sorts of position information are in agreement or not.

If the position collating means on the side of the host apparatus 44 determines that the present position information agrees with the position information of the destination of the transportation, the transmitting means on the side of the host apparatus 42 transmits an unlock command giving a direction to unlock the key mechanism 31 of the transport container 30 as the management information to the transport container 30.

When the receiving means 37 receives the unlock command giving a direction to unlock the key mechanism 31 from the host apparatus 40, the unlock command collating means 35 determines whether the unlock command is correct or not. If the unlock command collating means 35 determines that the unlock command is correct, the unlock directing means 36 directs the key driving means 32 to unlock the key mechanism 31.

In the transport container 30, if the unlock command collating means 35 determines that the unlock command is not correct, the transmitting means 38 transmits abnormal information to the host apparatus 40. The counting means of the host apparatus 40 counts the number of times of receipt of the abnormal information from the transport container 30 by the receiving means on the side of the host apparatus 43, the comparing means compares a counted value obtained by the counting means with a predetermined value, and the reporting means reports an occurrence of an emergency to the department concerned therewith if the comparing means determines that the counted value has reached the predetermined value.

If the comparing means determines that the counted value does not exceed the predetermined value, the transmitting means on the side of the host apparatus 42 may transmit again the unlock command giving a direction to unlock the key mechanism 31 as the management information to the transport container 30.

In this case, if the comparing means determines that the counted value has reached the predetermined value, the transmitting means on the side of the host apparatus in the host apparatus 40 may transmit an alarm command directing an alarming operation as the management information to the transport container 30, and the alarming means 39 of the transport container 30 may generate an alarm if the receiving means 37 receives the alarm command as the management information from the host apparatus 40.

According to the transport container managing system of this invention, it is impossible to unlock the key mechanism 31 without receiving a correct unlock command from the host apparatus 40. It is thus possible to manage command information used to unlock the key mechanism 31 for each transport container 30, and ensure the security of the transported goods even if the position detecting means 34 fails, for example.

According to the transport container managing system of this invention, the transport container 30 may receive the unlock command from the host apparatus 40 for a predetermined number of times until a correct unlock command is input. If a correct unlock command is input before the number of times of receipt of the unlock command reaches a predetermined number of times, it is possible to unlock the key mechanism 31. It is thus possible to prevent the host apparatus 40 and the alarming means 39 of the transport container 39 from erroneously giving an emergency alarm.

Figure 4:
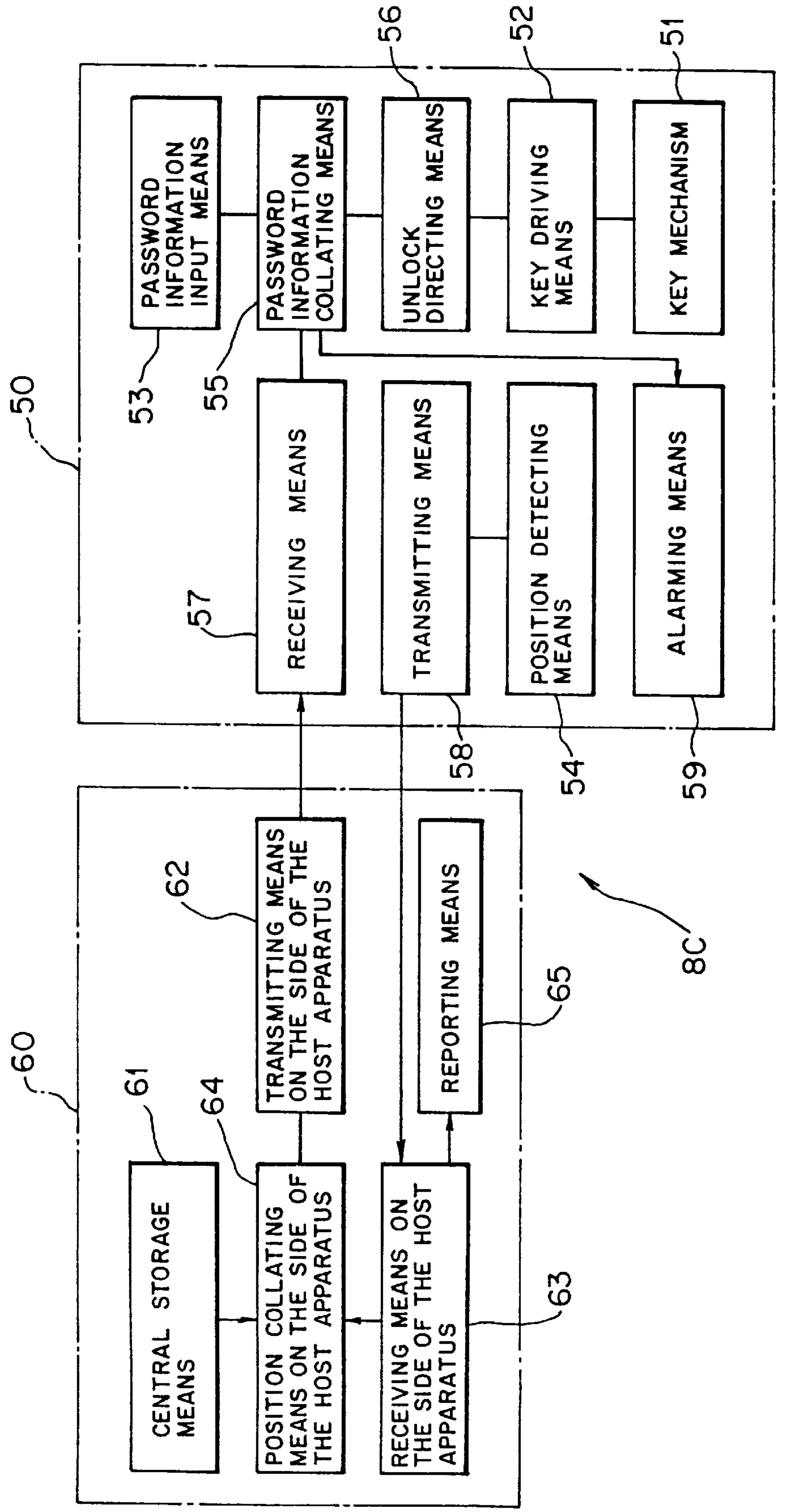
FIG. 4 is a block diagram showing a fourth aspect of this invention.

FIG. 4 is a block diagram showing a fourth aspect of this invention. In FIG. 4, reference numeral 8C denotes a transport container managing system. The transport container managing system 8C includes a transport container 50 closed in a condition that transported goods are housed therein and locked by a key mechanism 51 upon a transportation, and a host apparatus 60 for managing the transport container 50.

The transport container 50 has a key driving means 52, a password information input means 53, a position detecting means 54, a password information collating means 55, an unlock directing means 56, a receiving means 57 and a transmitting means 58, in addition to the key mechanism 51.

Each of the key mechanism 51, the key driving means 52, the position detecting means 54, the unlock directing means 56 and the transmitting means 58 of the transport container 50 has a function similar to that of the corresponding elements of the transport container 30 having been described with reference to FIG. 3 (refer to reference numerals 31, 32, 34, 36 and 38).

The transmitting means 58 transmits destination arrival information attached present position information detected by the position detecting means 54 thereto to the host apparatus 60 when the transport container 50 gets to a destination, similarly to the transmitting means 38 having been described with reference to FIG. 3.

The receiving means 57 receives management information from the host apparatus 60. The password information input means 53 is used to input password information for unlocking the key mechanism 51.

When the receiving means 57 receives password information for collation necessary when the key mechanism 51 is unlocked from the host apparatus 60, the password information collating means 55 collates the password information for collation with input password information input through the password information input means 53 to determine whether these two sorts of password information are in agreement or not. If the password information collating means 55 determines that the password information for collation and the input password information are in agreement, the unlock directing means 56 directs the key driving means 52 to unlock the key mechanism 51.

The host apparatus 60 has a central storage means 61, a transmitting means on the side of host apparatus 62, a receiving means on the side of the host apparatus 63 and a position collating means on the side of the host apparatus 64.

The central storage means 61 stores management information for the transport container 50. The transmitting means on the side of the host apparatus 62 transmits the management information for managing the transport container 50 to the transport container 50. The receiving means on the side of the host apparatus 63 receives information about the transport container 50 from the transport container 50.

The position collating means on the side of the host apparatus 64 collates the present position information attached to the destination arrival information received from the transport container 50 by the receiving means on the side of the host apparatus 63 with position information of a destination of a transportation stored as the management data in the central storage means 61 to determine whether these two sorts of position information are in agreement or not.

If the position collating means on the side of the host apparatus 64 determines that the present position information agrees with the position information of the destination of the transportation, the transmitting means on the side of the host apparatus 62 transmits password information for collation necessary when the key mechanism 51 of the transport container 50 is unlocked as the management information to the transport container 50.

The transport container 50 may have an alarming means 59 for generating an alarm if the password information collating means 55 determines that the password information for collation and the input password information are in disagreement. In this case, the transmitting means 58 may transmit abnormal information to the host apparatus 60. The host apparatus 60 may have a reporting means 65 for reporting an occurrence of an emergency to the department concerned therewith if the receiving means on the side of the host apparatus 63 receives alarm information from the transport container 50.

In each of the transport container managing systems 8A and 8C having been described with reference to FIGS. 2 and 4, respectively, the transmitting means on the side of the host apparatus 22 or 62 transmits, on occasion, a position confirm command demanding a transmission of position information about the transport container 10 or 50 during a transportation as the management information to the transport container 10 or 50. In each of the transport containers 10 and 50, when the receiving means 17 or 57 receives the position confirm command as the management information, the transmitting means 18 or 58 may transmit present position information of the transport container 10 or 50 during the transportation detected by the position detecting means 14 or 54 to the host apparatus 20 or 60.

Each of the transport container managing systems 8A and 8C having been described with reference to FIGS. 2 and 4, respectively, may have the alarming means 19 or 59 for generating an alarm and the transmitting means 38 for transmitting alarm information to the host apparatus 20 or 60 if the password information collating means 55 determines that the password information for collation and the input password information are in disagreement.

In the above transport container managing system shown in FIG. 4, the transmitting means 58 in the transport container 50 transmits destination arrival information, which is attached to present position information detected by the position detecting means 54, to the host apparatus 60 when the transport container 50 gets to a destination of transportation. The position collating means on the side of the host apparatus 64 in the host apparatus 60 collates the present position information attached to the destination arrival information received from the transport container 50 by the receiving means on the side of the host apparatus 63 with the position information of the destination of the transportation stored as management information in the central storage means 61 to determine whether these two sorts of position information are in agreement or not.

If the position collating means on the side of the host apparatus 64 determines that the present position information agrees with the position information of the destination of the transportation, the transmitting means on the side of the host apparatus 62 transmits password information for collation necessary when the key mechanism 51 of the transport container 50 is unlocked as management information to the transport container 50.

When the receiving means 57 receives the password information for collation necessary when the key mechanism 51 is unlocked from the host apparatus 60, the password information collating means 55 collates the password information for collation with input password information for unlocking the key mechanism 51 input through the password information input means 53 to determine whether these two sorts of password information are in agreement or not.

If the password information collating means 55 determines that the password information for collation and the input password information are in agreement, the unlock directing means 56 directs the key driving means 52 to unlock the key mechanism 51.

If the password information collating means 55 determines that the password information for collation and the input password information are in disagreement, the alarming means 59 of the transport container 50 may generate an alarm, and the transmitting means 58 may transmit abnormal information to the host apparatus 60. The reporting means 65 of the host apparatus 60 may report an occurrence of an emergency to the department concerned therewith if the receiving means on the side of the host apparatus 63 receives alarm information from the transport container 50.

In each of the transport container managing systems shown in FIGS. 2 and 4, respectively, the transmitting means on the side of the host apparatus 22 or 62 may transmit, on occasion, a position confirm command demanding a transmission of position information about the transport container 10 or 50 during a transportation as management information to the transport container 10 or 50. In each the transport containers 10 and 50, when the receiving means 17 or 57 receives the position confirm command as the management information, the transmitting means 18 or 58 may transmit present position information about the transport container 10 or 50 during the transportation detected by the position detecting means 14 or 54 to the host apparatus 20 or 60.

Each of the alarming means 19 and 58 may generate an alarm if the password information collating means 55 determines that the password information for collation and the input password information are in disagreement. Each of the transmitting means 18 and 58 may transmit alarm information to the host apparatus 20 or 60.

Accordingly, the transport container managing system of this invention may perform an unlocking control on the key mechanism 51 on a condition that a collation of the password information entered in advance with the password information input from the transport container 50 results in an agreement. It is therefore possible to manage the password information used to unlock the key mechanism 51 for each transport container 50. It is also possible to ensure the security of the transported goods even if the position detecting means 54 fails since the key mechanism 51 of the transport container 50 cannot be unlocked without receiving the password information from the host apparatus 60.

According to the transport container managing system of this invention, the host apparatus 60 may recognize present position information of the transport container 50 during a transportation. If the transport container 50 encounters a robbery, it is thus possible to detect a position of the stolen transport container 50.

Figure 5:
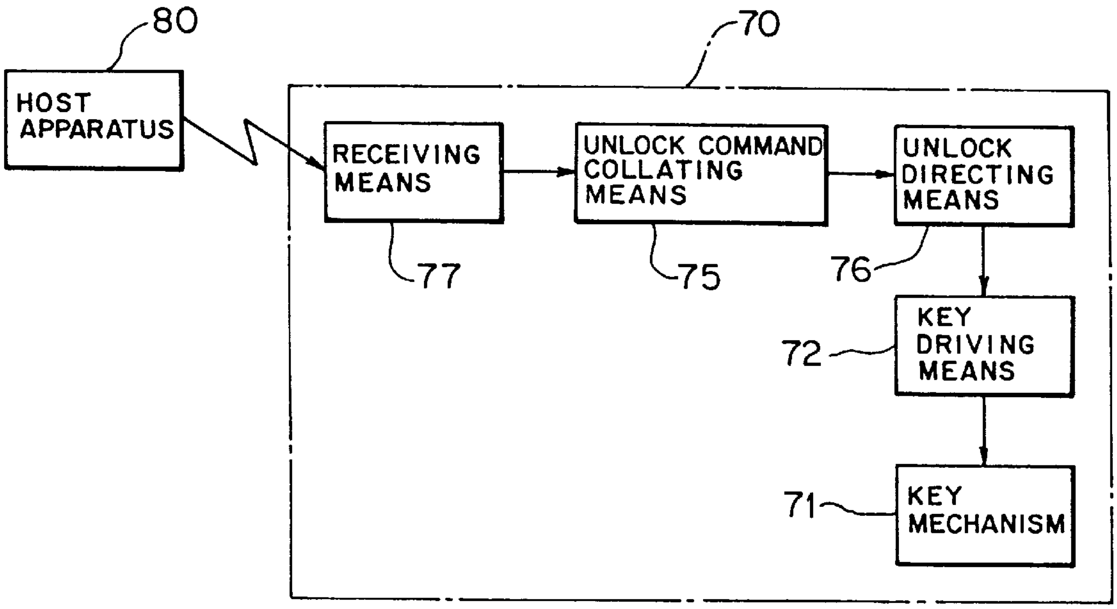
FIG. 5 is a block diagram showing a fifth aspect of this invention.

FIG. 5 is a block diagram showing a fifth aspect of this invention. In FIG. 5, reference numeral 70 denotes a transport container. The transport container 70 is closed when transported goods are housed therein and locked by a key mechanism 71 upon transportation.

The transport container 70 has a key driving means 72, an unlock command collating means 75, an unlock directing means 76 and a receiving means 77, in addition to the key mechanism 71.

The key driving means 72 drives the key mechanism 71 to switch a lock/unlock condition of the key mechanism 71. The receiving means 77 receives an unlock command giving a direction to unlock the key mechanism 71 from the host apparatus 80 upon an operation to unlock the key mechanism 71.

The unlock command collating means 75 determines whether the unlock command received from the host apparatus 80 by the receiving means 77 is correct or not. The unlock directing means 76 directs the key driving means 72 to unlock the key mechanism 71 if the unlock command collating means 75 determines that the unlock command is correct.

The above transport container shown in FIG. 5 is closed when transported goods are housed therein and locked by the key mechanism 71 upon transportation.

The receiving means 77 receives an unlock command giving a direction to unlock the key mechanism 71 from the host apparatus 80 upon an operation to unlock the key mechanism 71. The unlock command collating means 75 determines whether the unlock command received from the host apparatus 80 by the receiving means 77 is correct or not. If the unlock command is determined to be correct, the unlock directing means 76 directs the key driving means 72 to unlock the key mechanism 71. The key driving means 72 then switches a lock/unlock condition of the key mechanism 71 by driving the key mechanism 71 to unlock the same.

According to the transport container of this invention, the receiving means 77 of the transport container 70 receives an unlock command or password information for collation from the host apparatus 80. On a condition required to unlock the key mechanism 71 such that the unlock command is correct or a collation of the password information for collation results in an agreement, the security of the transported goods may be, at least, ensured. According to the above embodiment, there is no need to enter, in advance, position information of a destination of a transportation.

Figure 6:
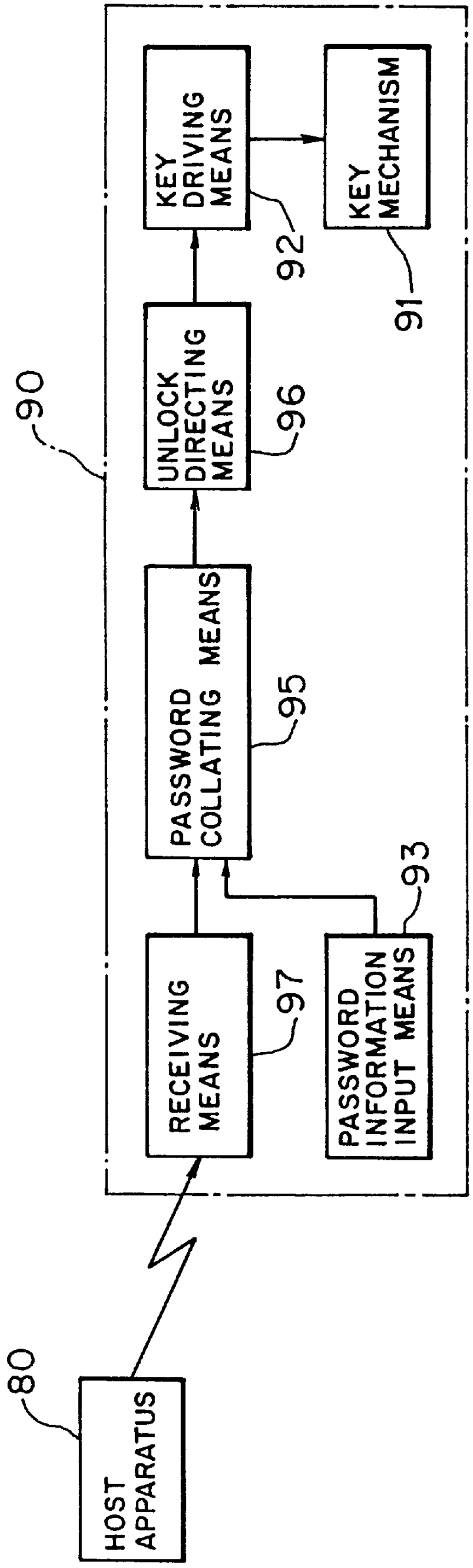
FIG. 6 is a block diagram showing a sixth aspect of this invention.

FIG. 6 is a block diagram showing a sixth aspect of this invention. In FIG. 6, reference numeral 90 denotes a transport container. The transport container 90 is closed when transported goods are housed therein and locked by a key mechanism 91 upon transportation.

The transport container 90 has a key driving means 92, a receiving means 97, a password information input means 93, a password information collating means 95 and an unlock directing means 96, in addition to the key mechanism 91.

The key driving means 92 switches a lock/unlock condition of the key mechanism 91 by driving the same. The receiving means 97 receives password information for collation necessary when the key mechanism 91 is unlocked from a host apparatus 80.

The password information input means 93 is used to input password information for unlocking the key mechanism 91. The password information collating means 95 collates the password information for collation received by the receiving means 97 with the input password information input through the password information input means 93 upon an operation to unlock the key mechanism 91 to determine whether these two sorts of password information are in agreement or not.

The unlock directing means 96 directs the key driving means 92 to unlock the key mechanism 91 if the password information collating means 95 determines that the password information for collation and the input password information are in agreement.

The above transport container shown in FIG. 6 is closed when transported goods are housed therein and locked by the key mechanism 91 upon transportation.

The receiving means 97 receives password information for collation necessary when the key mechanism 91 is unlocked from the host apparatus 80. The password information input means 93 is used to input password information for unlocking the key mechanism 91.

The password information collating means 95 collates the password information for collation received by the receiving means 97 with the input password information input through the password information input means 93 to determine whether these two sorts of password information are in agreement or not upon an operation to unlock the key mechanism 91. If the two sorts of password information are determined to be in agreement, the unlock directing means 96 directs the key driving means 92 to unlock the key mechanism 91. The key driving means 92 drives the key mechanism 91 to switch a lock/unlock condition of the key mechanism 91, thereby unlocking the same.

According to the transport container of this invention, the receiving means 97 of the transport container 90 receives an unlock command or password information for collation from the host apparatus 80. On a condition required to unlock the key mechanism 91 such that the unlock command is correct or a collation of the password information for collation results in an agreement, the security of the transported goods may be, at least, ensured. According to this manner, there is no need to enter, in advance, position information of a destination of a transportation.

(b) Description of First Embodiment

Figure 7:
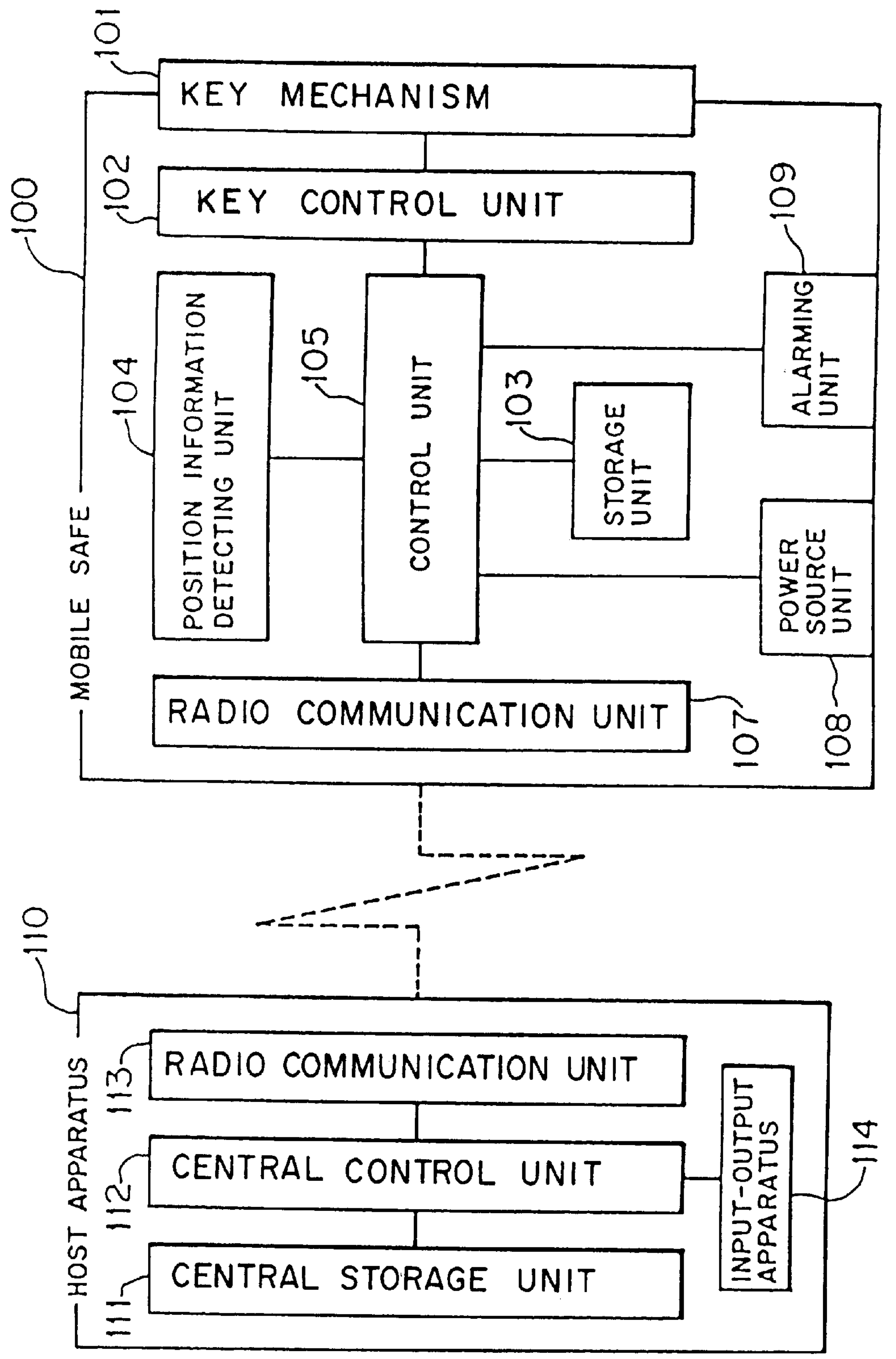
FIG. 7 is a block diagram functionally showing a transport container managing system according to a first embodiment of this invention.

FIG. 7 is a block diagram functionally showing a transport container managing system according to a first embodiment of this invention. The transport container managing system can be, for example, adapted as a security managing system for a cash transporting vehicle 121 used when a banking facility or the like transports cash, as shown in FIG. 8.

Figure 8:
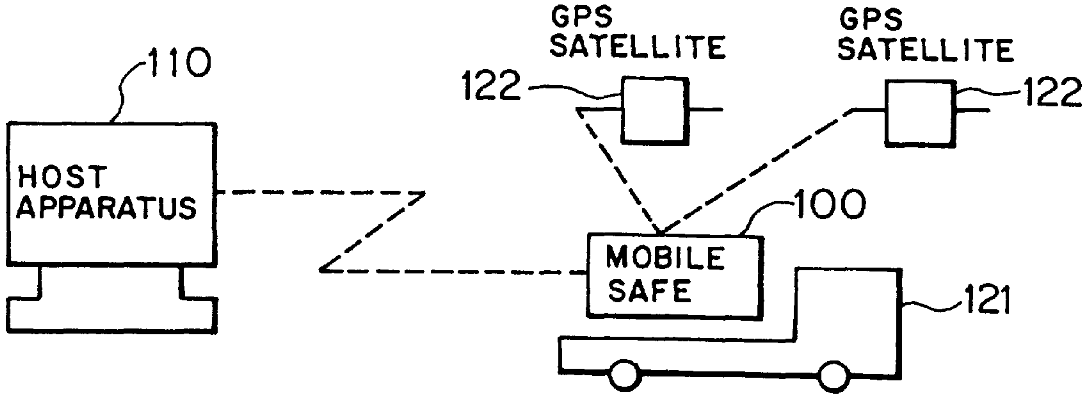
FIG. 8 is a block diagram block diagram of a security managing system applied to the first embodiment of this invention.

In FIG. 8, when the cash transporting vehicle 121, on which a mobile safe (a transport container) 100 containing cash is loaded, transports cash to a predetermined place, a remote host apparatus (a host apparatus) 110 determines a position of the cash transporting vehicle 121 through a detection of the position of the cash transporting vehicle 121 by a GPS (Global Positioning System) satellite 122 or the like to manage security.

The above mobile safe 100, which contains cash and is loaded on the cash transporting vehicle 121 to transport the cash, has a key mechanism 101, a key control unit 102, a storage unit 103, a position information detecting unit 104, a control unit 105, a radio communicating unit 107, a power source unit 108 as an energy supplying source, and an alarming unit 109, as shown in FIG. 7. From the viewpoint of hardware, the mobile safe 100 has a structure as shown in a hardware block diagram shown in FIG. 9 or 10.

Figure 9:
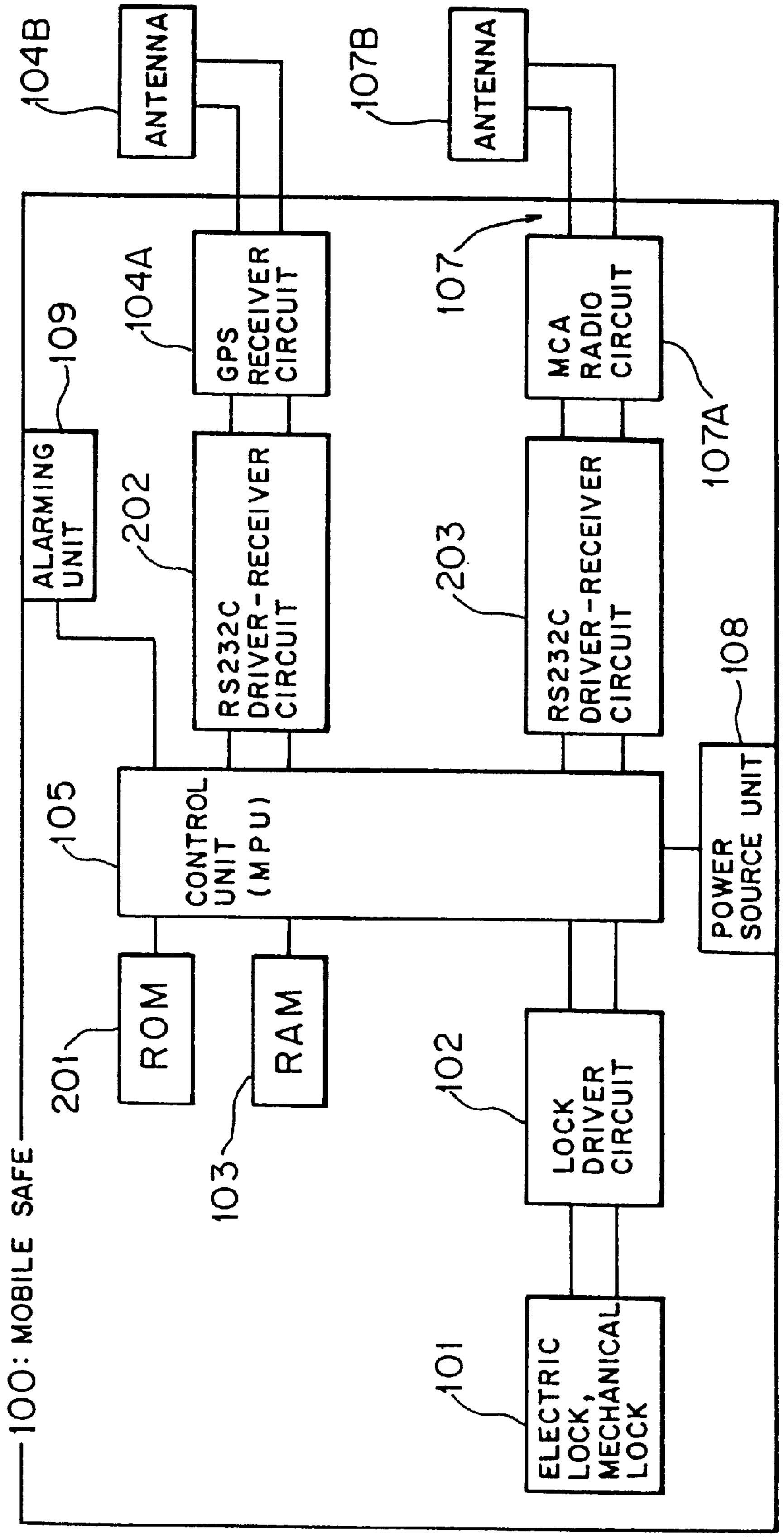
FIGS. 9 and 10 are block diagrams showing hardware structures of a mobile safe according to the first embodiment of this invention.
Figure 10:
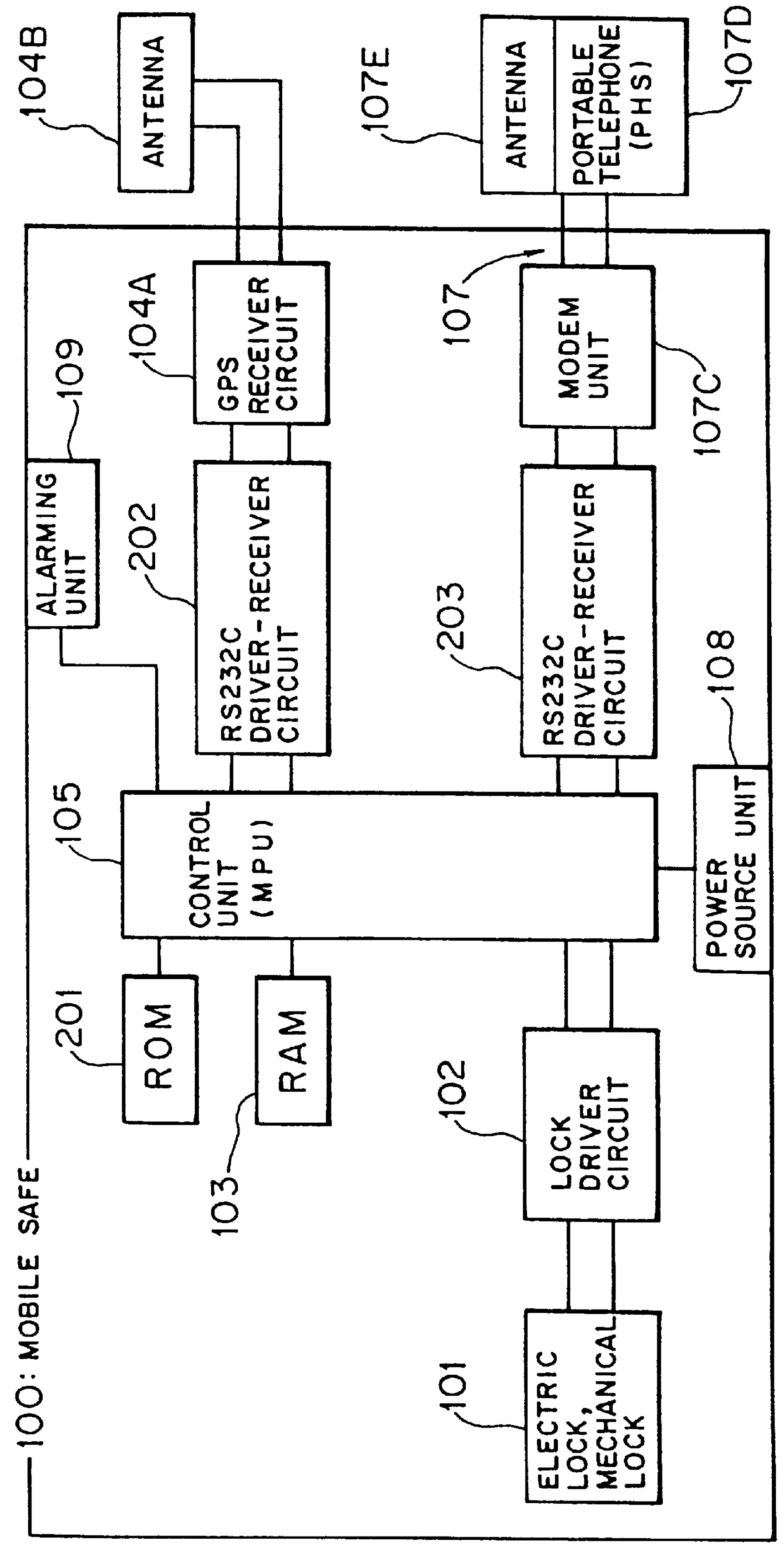

In the mobile safe 100 shown in FIG. 9, only the radio communicating unit 107 has a structure different from that of the radio communicating unit 107 shown in FIG. 10. Other structural elements are basically the same.

The radio communicating unit (a transmitting means, a receiving means) 107 receives management information from the host apparatus 110, while transmitting information in terms of the mobile safe 100 to the host apparatus 110. For example, the radio communicating unit 107 may be configured with an MCA radio circuit 107A and an antenna 107B, as shown in FIG. 9. Alternatively, the radio communicating unit 107 may be configured with a modem 107C, a portable telephone 107D and an antenna 107E, as shown in FIG. 10.

The key mechanism 101 is closed and locked upon transportation when cash is housed therein. The key mechanism 101 is configured with, for example, an electric lock or a mechanical lock, as shown in FIG. 9 or 10.

The key control unit (a key driving means) 102 drives the key mechanism 101 to switch a lock/unlock condition of the key mechanism 101, in other words, perform an open/close control on the key mechanism 101. The key control unit 102 is configured with, for example, a lock driver circuit, as shown in FIG. 9.

The storage unit (a storage means) 103 stores in advance position information about a destination of a transportation of the mobile safe 100 whose key mechanism 101 is to be unlocked thereat. The storage unit 103 is configured with, for example, a RAM, an EPROM, etc., as shown in FIG. 9 or 10.

The position information detecting unit (a position detecting unit) 104 detects a present position of the mobile safe 100. The position information detecting unit 104 is configured with, for example, GPS (Global Positioning System) receiver circuits 104A and 104B, and a gyro compass (not shown in FIGS. 9 and 10), etc., as shown in FIG. 9.

The control unit 105 supervises and controls an operation of the mobile safe 100, being configured with, for example, an MPU, as shown in FIG. 9 or 10.

The control unit 105 has a function as a position collating means to collate position information of a destination of a transportation stored in the storage unit 103 with position information of the mobile safe 100 detected by the position detecting unit 104, and to determine whether these two sorts of position information are in agreement with each other or not upon an operation to unlock the key mechanism 100. In addition, the control unit 105 has another function as an unlock directing means to direct the key control unit 102 to unlock the key mechanism 101 if the position information of the destination of the transportation and the position information are determined to be in agreement.

The alarming unit (an alarming means) 109 lights a lamp in, for example, red color or sounds a siren to give an alarm, if the control unit 105 determines that the position information of the destination of the transportation and the present position information are in disagreement.

The power source unit 108 is a power supply source of an electric energy used to operate the mobile safe 100, whose security is ensured by being isolated from the outside and built in the mobile safe 100.

In FIG. 9 or 10, reference numeral 201 denotes a ROM for storing data such as a program therein to activate an MPU as the control unit 105. Reference numerals 202 and 203 denote RS232C driver-receiver circuits as interfaces with the position information detecting unit 104 and the radio communicating unit 107, respectively.

The host apparatus 110 remotely managing a security of the mobile safe 100 has a central storage unit 111, a central control unit 112 and a radio communicating unit 113, in addition to an input-output apparatus 114 such as a display, a keyboard, etc., as shown in FIG. 7.

The central storage unit (a central storage means) 111 stores management data for the mobile safe 100, which is configured with a hard disk, an magneto-optic disk, or the like.

The central control unit 112 supervises and controls the entire host apparatus 110. The central control unit 112 has a reporting unit 114. When receiving an emergency alarm notice from the mobile safe 100 through the radio communicating unit 107, the reporting unit 114 reports it to a department concerned therewith.

The radio communicating unit (a transmitting means on the side of the host apparatus, a receiving means on the side of the host apparatus) 113 communicates with the mobile safe 100 through the radio communicating unit 107. Namely, the radio communicating unit 113 transmits management information used to manage the mobile safe 100 to the mobile safe 100, while receiving information in terms of the mobile safe 100 from the mobile safe 100.

Figure 11:
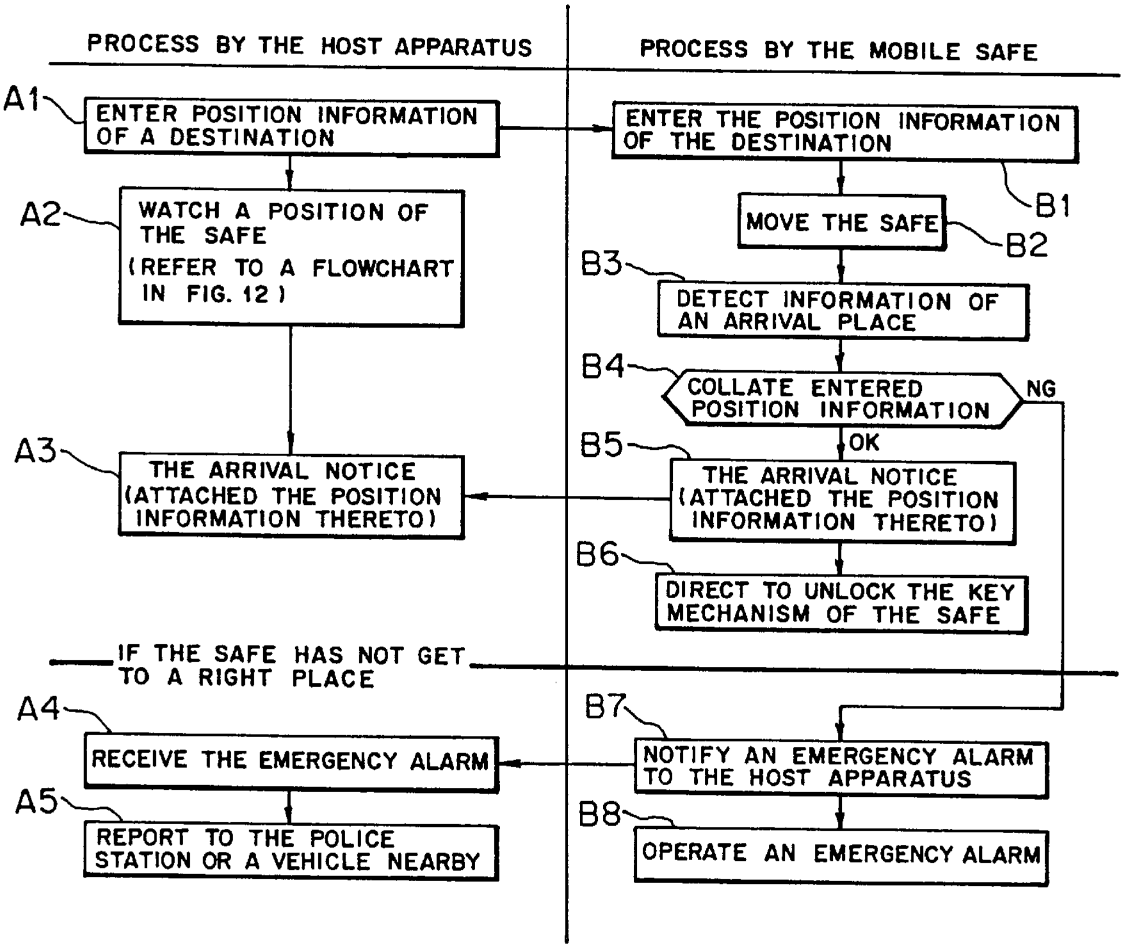
FIGS. 11 and 12 are flowcharts for illustrating an operation of the first embodiment of this invention.

An operation of the transport container managing system with the above structure according to the first embodiment of this invention will be described with reference to a flowchart (Step A1 to Step A5, and Step B1 to Step B8) shown in FIG. 11 and a flowchart (Step A6 to Step A8, and Step B9 to Step B11) shown in FIG. 12.

When the mobile safe 100 is loaded on the cash transporting vehicle 121 to be transported to a predetermined place, position information about a destination of the transportation is stored in the central storage unit 111 of the host apparatus 110 (Step A1). At the same time, the position information of the designation of the transportation is, for example, transmitted through the radio communicating unit 113 to the mobile safe 100 to be stored as information used to lock/unlock the key mechanism 101 in the storage unit 103 of the mobile safe 100, as well (Step B1).

Then, the cash transporting vehicle 121 departs for the destination which has been entered, and the mobile safe 100 loaded thereon is transported to the predetermined place (Step B2). The host apparatus 110 can determine a position of the mobile safe 100 even during transportation by the cash transporting vehicle 121 on the basis of a process as shown in the flowchart in FIG. 12 which will be described later (Step A2).

When the transportation by the cash transporting vehicle 121 is finished and the key mechanism 101 of the mobile safe 100 is unlocked, the position information detecting unit 104 of the mobile safe 100 detects a present position of the mobile safe 100 (Step B3).

The control unit 105 collates present position information of the mobile safe 100 detected by the position information detecting unit 104 with position information of the destination of the transportation stored in the storage unit 103 to determine whether these two sorts of position information are in agreement or not (Step B4).

If the present position information of the mobile safe 100 agrees with the position information of the destination of the transportation stored in the storage unit 103 as a result of a collation of the position information by the control unit 105 (an OK route at Step B4), it is determined that the mobile safe 100 has arrived at the destination previously entered. The radio communicating unit 107 notifies destination arrival information, which is added to the position information, to the host apparatus 110 (Step B5, and Step A3). After that, the control unit 105 directs the key control unit 102 to unlock the key mechanism 101 (Step B6).

If the present position information of the mobile safe 100 is not in agreement with the destination position information stored in the storage unit 103 as a result of the collation of the position information by the control unit 105, it is determined that the mobile safe 100 has not arrived at the destination previously entered. Therefore, an emergency alarm notice is transmitted through the radio communicating unit 107 to the radio communicating unit 113 of the host apparatus 110 (an NG route at Step B4 to Step B7) to operate an emergency alarm in the alarming unit 109 (Step B8).

If the host apparatus 110 receives the emergency alarm notice from the radio communicating unit 107 (Step A4), under a control of the reporting unit 114, an occurrence of an emergency is notified to the department concerned therewith in a police station or a vehicle nearby on a radio or a telephone (Step A5).

A manner to monitor a position of the mobile safe 100 on the cash transporting vehicle 121 during transportation on the side of the host apparatus 110 will be next described with reference to a flowchart shown in FIG. 12.

The host apparatus 110 transmits, on occasion, a position confirm command as management information to the mobile safe 100 (Step A6). When the radio communicating unit 107 of the mobile safe 100 receives the position confirm command (Step B9), the position information detecting unit 104 detects information about a present position under a control of the control unit 105 (Step B10), and transmits the detected present position information to the host apparatus (Step B11).

When the radio communicating unit 113 of the host apparatus 110 receives the present position detection information from the mobile safe 100, the central control unit 112 controls the input-output apparatus 104 such as a display to display the present position on a map on the basis of this information.

According to the transport container managing system of the first embodiment of this invention, the position information detecting unit 104 detects position information of the transported goods, and an unlocking control is performed on condition that the two sorts of position information are in agreement. If someone fraudulently obtains the transporting vehicle or the case, it is possible to prevent the case from being opened by him or her unless the position information having been entered agrees with a place where he or she tries to unlock the key mechanism 101. This transport container managing system according to the first embodiment of this invention can therefore advantageously improve the security of the transported goods.

Even during transportation, it is possible to determine a position of the mobile safe 100 on the side of the host apparatus 110. If the mobile safe 100 encounters a robbery, it is possible to detect a position of the stolen mobile safe 100.

(c) Description of Second Embodiment

A transport container managing system according to this embodiment can be adapted as a security managing system for the cash transporting vehicle 121 upon a cash transportation by, for example, a banking facility as shown in FIG. 8, similarly to the above-described transport container managing system according to the first embodiment. On the other hand, the transport container managing system of this embodiment has different control modes of the central control unit 112 in the host apparatus 110 and the control unit 105 in the mobile safe 100, as compared with those of the first embodiment.

More specifically, the central control unit 112 of the host apparatus 110 has a function as a position collating means on the side of the host apparatus to collate present position information, which is attached to the destination arrival information received by the radio communicating unit 113 from the mobile safe 100, with position information about a destination of a transportation stored as the management data in the central storage unit 111 to determine whether these two sorts of position information are in agreement or not.

If it is determined that these two sorts of position information are in agreement as a result of the above collation of the position information, the central control unit 112 transmits an unlock command as the management information giving a direction to unlock the key mechanism 101 of the mobile safe 100 to the mobile safe 100 from the radio communicating unit 113.

The control unit 105 of the mobile safe 100 has a function as an unlock command collating means to determine whether the unlock command is correct or not when receiving the unlock command as the management information from the above host apparatus 110 through the radio communicating unit 107.

In practice, the control unit 105 directs the key control unit 102 to unlock the key mechanism 101 if a determination that the present position information detected by the position information detecting unit 104 is in agreement with the position information about the destination of the transportation previously entered in the storage unit 103, and in addition the above unlock command is correct.

If a determination that the above unlock command is not correct, the control unit 105 transmits abnormal information to the host apparatus 110 through the radio communicating unit 107.

In this case, the central control unit 112 of the host apparatus 110 counts how many times the central control unit 112 has received the abnormal information from the mobile safe 100 through the radio communicating unit 113, and compares this counted value with a predetermined value. If it is determined that counted value reaches the predetermined value, the central control unit 112 reports an occurrence of an emergency to the department concerned therewith. If it is determined that the counted value does not exceed the predetermined value, the central control unit 112 controls the radio communicating unit 113 to transmit again the unlock command giving a direction to unlock the key mechanism 101 as the management information to the mobile safe 100.

If it is determined that the above counted value has reached the predetermined value in the central control unit 112 of the host apparatus 110, the central control unit 112 transmits an alarm command directing an alarming operation as the management information to the mobile safe 100 through the radio communicating unit 113. The mobile safe 100, when receiving the alarm command as the management information from the host apparatus 110 through the radio communicating unit 107, generates an alarm.

An operation of the transport container managing system with the above structure according to the second embodiment of this invention will be next described with reference to a flowchart (Step C1 through Step C11, and Step D1 through Step D12) shown in FIG. 13.

In the transport container managing system of this embodiment, the mobile safe 100 is loaded on the cash transporting vehicle 121. When the mobile safe 100 is transported to a predetermined place, the process to enter position information of a destination of the transportation in the central storage unit 111 of the host apparatus 110 (Step C1) and the process to determine a position of the mobile safe 100 during the transportation by the cash transporting vehicle 121 on the side of the host apparatus 110 (Step C2) are carried out in the same manner as the above-described first embodiment.

Figure 12:
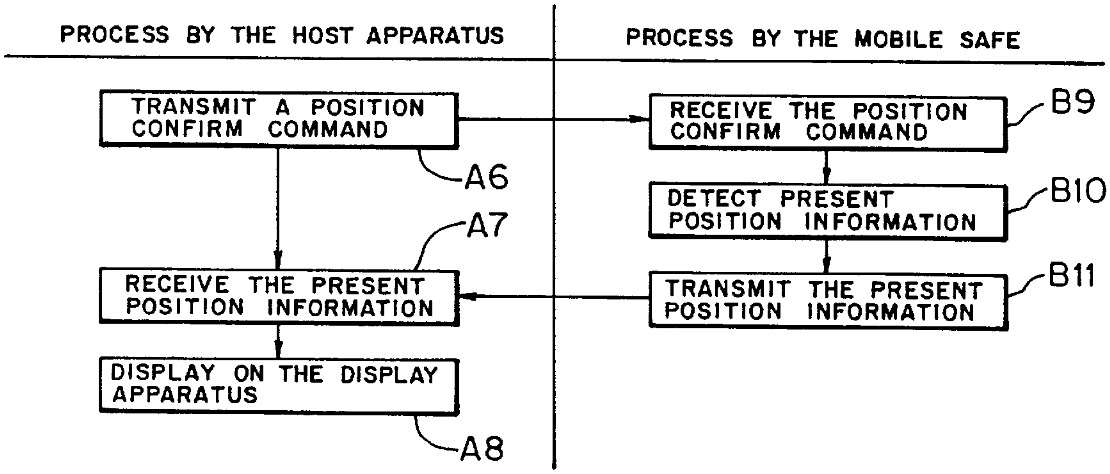

In this case, when the radio communicating unit 113 of the host apparatus 110 receives detected present position information from the mobile safe 100, the central control unit 112 controls the input-output apparatus 114 such as a display to display a present position on a map on the basis of this information, similarly to the above-described first embodiment (refer to the flowchart shown in FIG. 12).

On the side of the mobile safe 100, the process to enter position information of the destination of the transportation used to lock or unlock the key mechanism 101 in the storage unit 103 (Step D1) to the process performed by the control unit 105 to determine whether present position information of the mobile safe 100 detected by the position information detecting unit 104 and the position information of the destination of the transportation stored in the storage unit 103 (Step D4) are in agreement or not are performed similarly to the above-described first embodiment.

If the present position information of the mobile safe 100 is not in agreement with the destination position information stored in the storage unit 103 as a result of a collation of the position information by the control unit 105, it is determined that the mobile safe 100 has not arrived at the entered destination. The mobile safe 100 transmits an emergency alarm notice to the radio communicating unit 113 of the host apparatus 110 from the radio communicating unit 107 (from an NG route at Step D4 to Step D9) to operate an emergency alarm in the alarming unit 109.

When the host apparatus 110 receives the emergency alarm notice from the radio communicating unit 107 (Step C6), the reporting unit 114 notifies an occurrence of an emergency to the department concerned therewith such as a police station or a vehicle nearby on a radio or a telephone (Step C7).

If the present position information of the mobile safe 100 is in agreement with the destination position information stored in the storage unit 103 as a result of an agreement determining process by the control unit 105 (an OK route at Step D4), the radio communicating unit 107 communicates the destination arrival information, which is attached to the present position information, to the host apparatus 110 (Step D5).

When the radio communicating unit 113 of the host apparatus 110 receives the destination arrival information, which is attached to the present position information, from the mobile safe 100 (Step C3), the central control unit 112 collates this present position information with the position information of the destination of the transportation stored as the management data in the central storage unit 111 to determine whether these two sorts of position information are in agreement or not (Step C4).

This double position collating process on both sides of the mobile safe 100 and the host apparatus 110 may increase the reliability of a determination of the position collation.

If it is determined that the two sorts of position information are in agreement as a result of the above collation of the position information (an OK route at Step C4), the central control unit 112 determines that the mobile safe 100 has arrived at the destination previously entered. The radio communicating unit 113 then transmits an unlock command as management information giving a direction to unlock the key mechanism 101 to the mobile safe 100 (Step C5).

When receiving the unlock command as management information from the above-mentioned host apparatus 110 via the radio communicating unit 107 (Step D6), the control unit 105 of the mobile safe 100 collates as to whether this unlock command is correct (appropriate) or not (Step D7).

If a determination that the unlock command from the above host apparatus 110 is correct, the control unit 105 directs the key control unit 102 to unlock the key mechanism 101 (Step D8).

If a determination that the above unlock command is not correct, the control unit 105 transmits abnormal information to the host apparatus 110 from the radio communicating unit 107 (from an NG route at Step D7 to Step D10).

If the radio communicating unit 113 of the host apparatus 110 receives the abnormal information from the mobile safe 100 (Step C8), the central control unit 112 counts the number of times of receipt of the abnormal information.

The central control unit 112 compares this counted value with a predetermined value (n, for example) stored in the central storage unit 111. If the counted value has reached the predetermined value (a YES route at Step C9), it is determined that the mobile safe 100 has not arrived at the right place.

If an alarm is required on the side of the mobile safe 100, an alarm command to operate an emergency alarm on the side of the mobile safe 100 is transmitted (from a YES route at Step C10 to Step C11). When the radio communicating unit 107 of the mobile safe 100 receives the alarm command (Step D11), an emergency alarm is operated in the alarming unit 109 (Step D12).

If it is determined in the central control unit 112 that the counted value does not exceed the predetermined value (a NO route at Step C9), the central control unit 112 controls the radio communicating unit 113 to transmit again the unlock command giving a direction to unlock the key mechanism 101 as the management information to the mobile safe 100 (Step C5).

If it is determined in the central control unit 112 that the counted value has reached the predetermined value (n, for example), and an emergency alarm is operated from the mobile safe 100 itself (a YES route at Step C9), the host apparatus 110 transmits an alarm command to the mobile safe 100 besides notifying the police station or a vehicle nearby (Step C1 and Step C7).

If no alarm announcement from the mobile safe 100 is desired (a No route at Step C9), the central control unit 112 only notifies the police station or a vehicle nearby (Step C7).

If the central control unit 112 determines that the counted value has reached the predetermined value, an occurrence of an emergency is reported to the department concerned therewith with or without a transmission of an alarm command to the mobile safe 100 (a NO route at Step C10, or from Step C11 to Step C7).

According to the transport container managing system of the second embodiment of this invention, the position information detecting unit 104 detects position information of the transported goods, and an unlocking control is performed on condition that the two sorts of position information are in agreement, similarly to the first embodiment described above. If someone fraudulently obtains the transporting vehicle or the case, it is possible to prevent the case from being opened by him or her unless the position information having been entered agrees with a place where he or her tries to unlock the key mechanism 101. This transport container managing system according to the second embodiment of this invention can advantageously improve the security of the transported goods.

The mobile safe 100 can receive the unlock command from the host apparatus 110 a predetermined number of times. If the unlock command agrees before the number of the received unlock command reaches the predetermined number of times, it is possible to unlock the mobile safe 100. It is therefore possible to prevent an erroneous operation of an emergency alarm by the host apparatus 110 and the alarming unit 109 of the mobile safe 100.

Without an unlock command from the host apparatus 110, it is impossible to unlock the key mechanism 101 of the mobile safe 100. Even if the position information detecting unit 104 fails, it is therefore possible to ensure the security of the transported goods.

Since unlock control is performed based on the condition that the double position collation on both sides of the mobile safe 100 and the host apparatus 110 results in an agreement and the collation of the unlock command from the host apparatus 110 results in that it is correct, it is possible to further increase the reliability of a determination of a position collation. It is also possible to increase the reliability of security of the transported goods since two conditions are required for unlocking.

During transportation, it is possible to determine a position of the mobile safe 100 on the side of the host apparatus 110. Even if the mobile safe 100 encounters a robbery, it is therefore possible to detect a position of the stolen mobile safe 100.

(3) Description of Third Embodiment

A transport container managing system according to this embodiment can be adapted as a security managing system for the cash transporting vehicle 121 upon a cash transportation by, for example, a banking facility as shown in FIG. 8, similarly to the above-described transport container managing systems according to the first and second embodiments. On the other hand, the transport container managing system of this embodiment has different control modes of the central control unit 112 in the host apparatus 110 and the structure of the mobile safe 100, as compared with those of the first and the second embodiments.

More specifically, when input present position information attached to the destination arrival information from the mobile safe 100, the central control unit (a position collating means on the side of the host apparatus) 112 of the host apparatus 110 collates this present position information with destination position information stored in the central storage unit 111 to determine whether these two sorts of position information are in agreement or not. If it is determined that the above two sorts of position information are in agreement, the central control unit 112 transmits password information for collation as management information necessary when the key mechanism 101 of the mobile safe 100 is unlocked to the mobile safe 100 through the radio communicating unit 113.

The mobile safe 100 has any one of password information input means 100*a* through 100*e* for inputting password information therethrough to unlock the key mechanism 101. As the password information input means 100*a* through 100*e*, there are, for example, a pin pad 100*a*, a magnetic card reader 100*b*, an IC card reader 100*c*, a fingerprint collator 100*d* and a voice input unit 100*e*, as shown in FIGS. 14 through 18.

Figure 14:
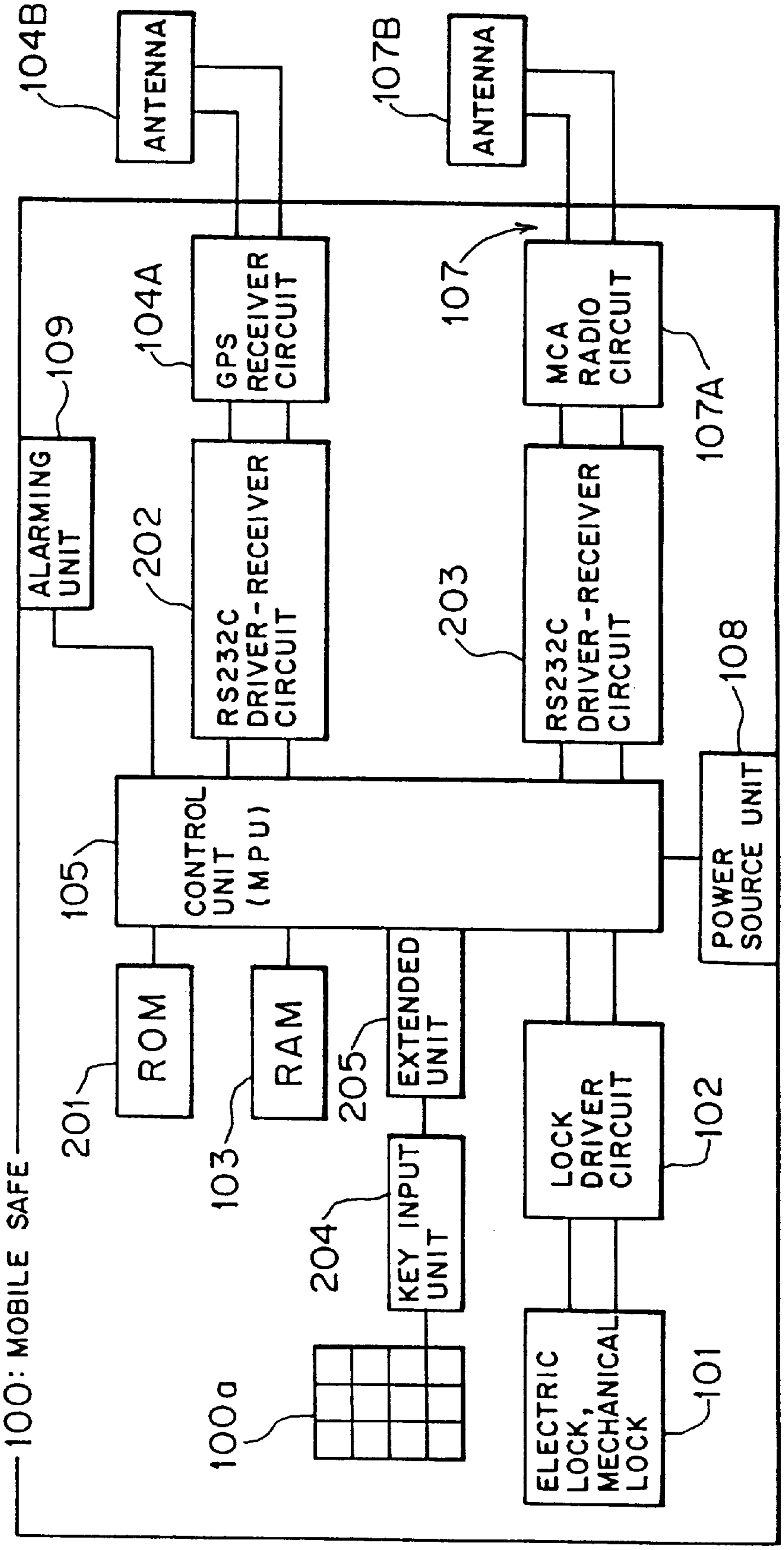
FIGS. 14 through 18 are block diagrams showing hardware structures of mobile safes according to a third embodiment of this invention.

As shown in FIG. 14, the pin pad 100*a* as the password information input means is operated to input a password as input password information if the password information for collation is a password. The input password information input through the pin pad 100*a* is input to the control unit 105 via a key input unit 204 and an extended unit 205.

Figure 15:
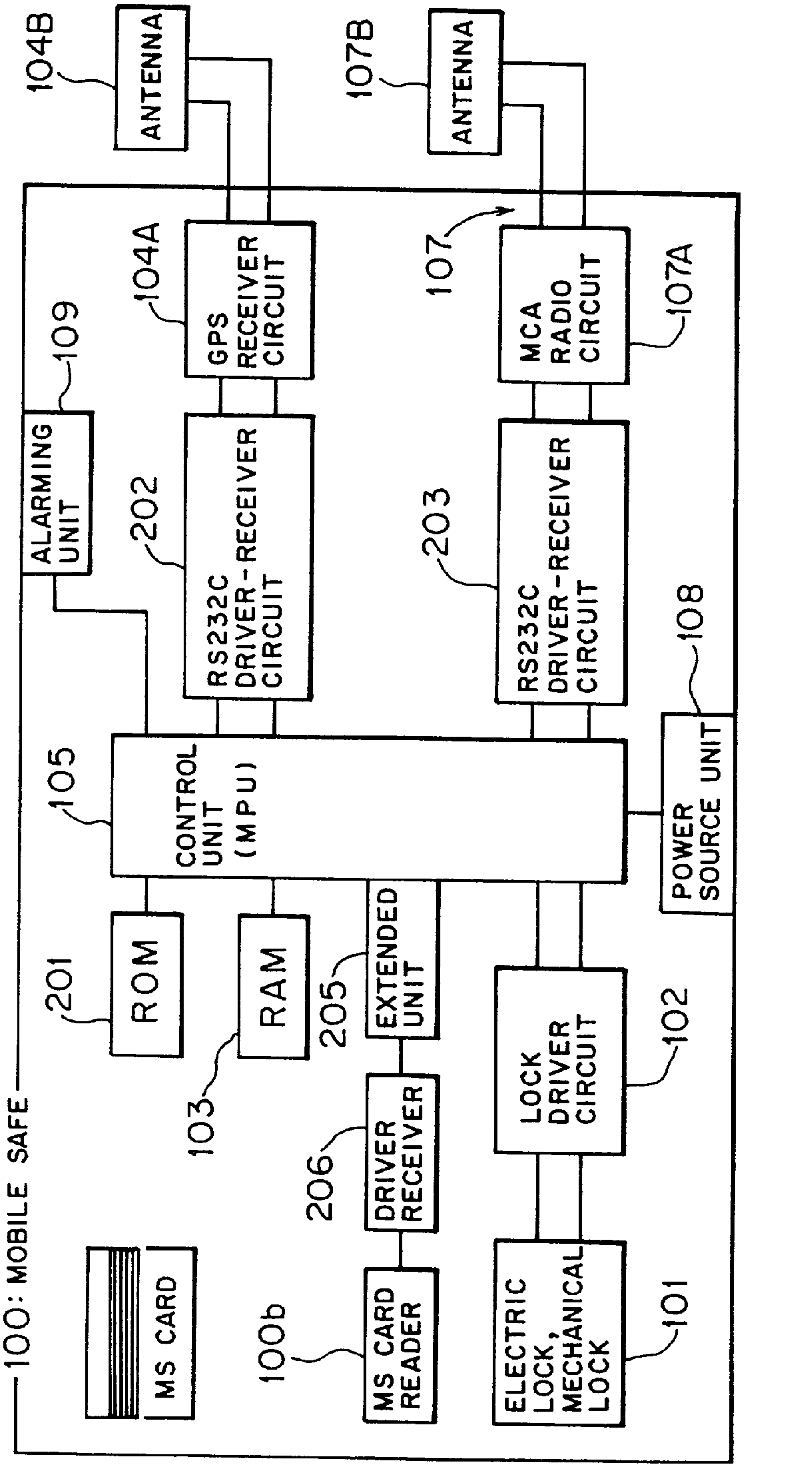

The magnetic card reader 100*b* shown in FIG. 15 reads a password as input password information from a magnetic stripe of a magnetic card in which password information is, in advance, stored as the password information for collation. The input password information is input to the control unit 105 via a driver receiver 206 and the extended unit 205.

Figure 16:
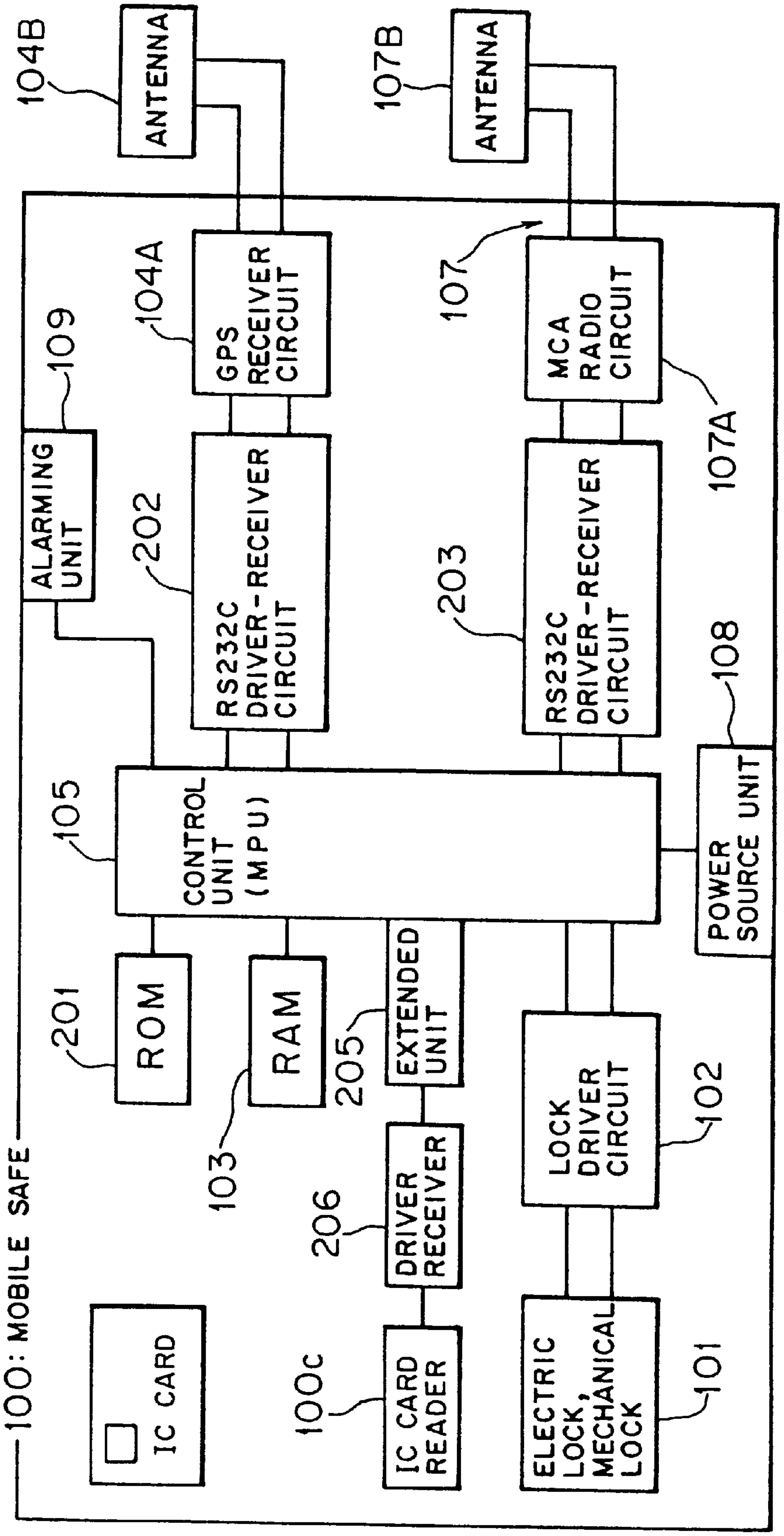

The IC card reader 100*c* shown in FIG. 16 reads input password information from an IC chip of an IC card in which password information as the password information for collation or fingerprint data or voice data of a specific unlocking operator who unlocks the key mechanism 101 is recorded. The input password information read out is input to the control unit 105 via the driver receiver 206 and the extended unit 205.

Figure 17:
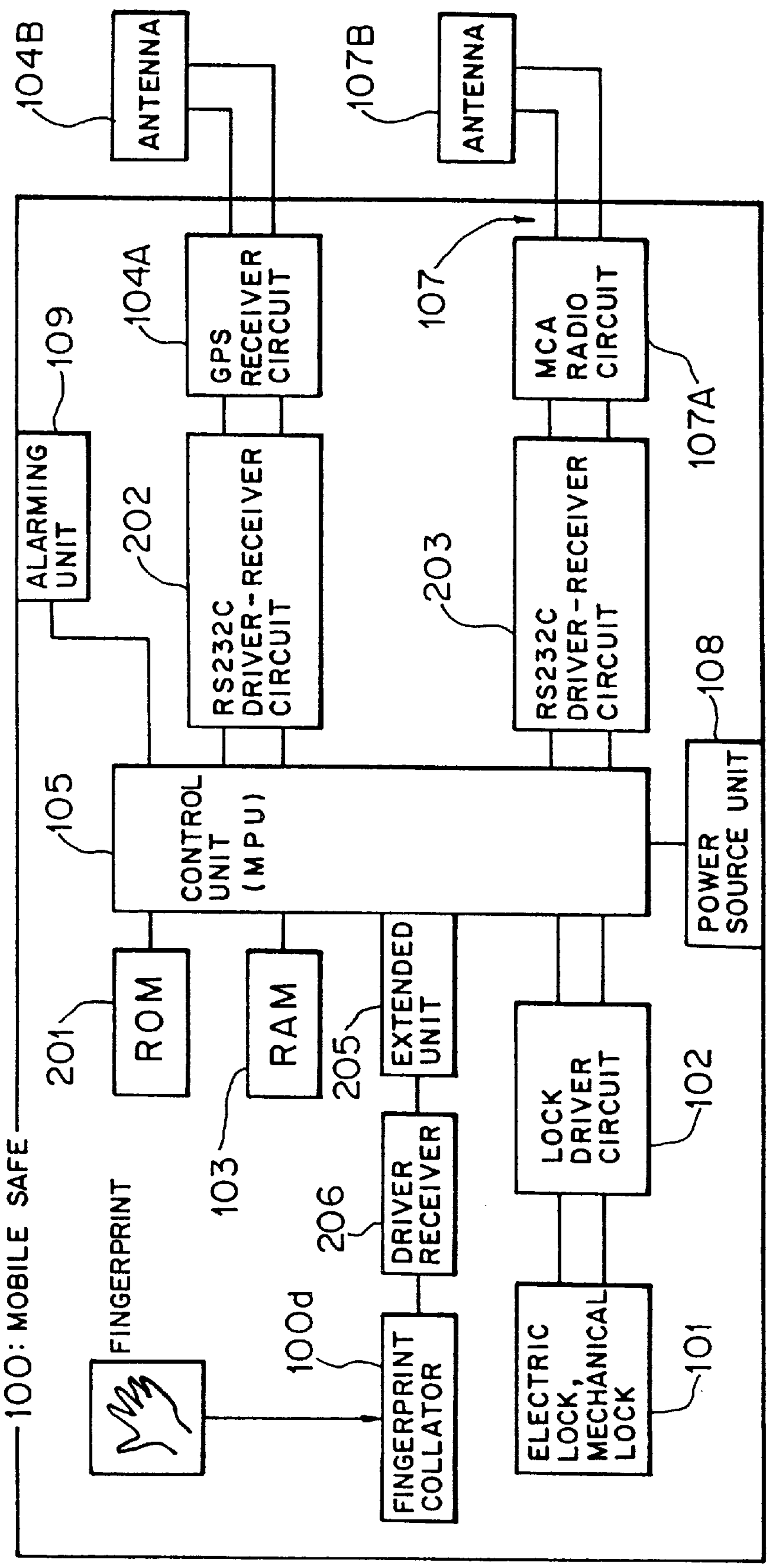

The fingerprint collator (a fingerprint reading apparatus) 100*d* shown in FIG. 17 reads a fingerprint of an unlocking operator as the input password information if the password information for collation is fingerprint data of a specific unlocking operator who unlocks the key mechanism 101. The input password information read out is input to the control unit 105 via the driver receiver 206 and the extended unit 205.

Figure 18:
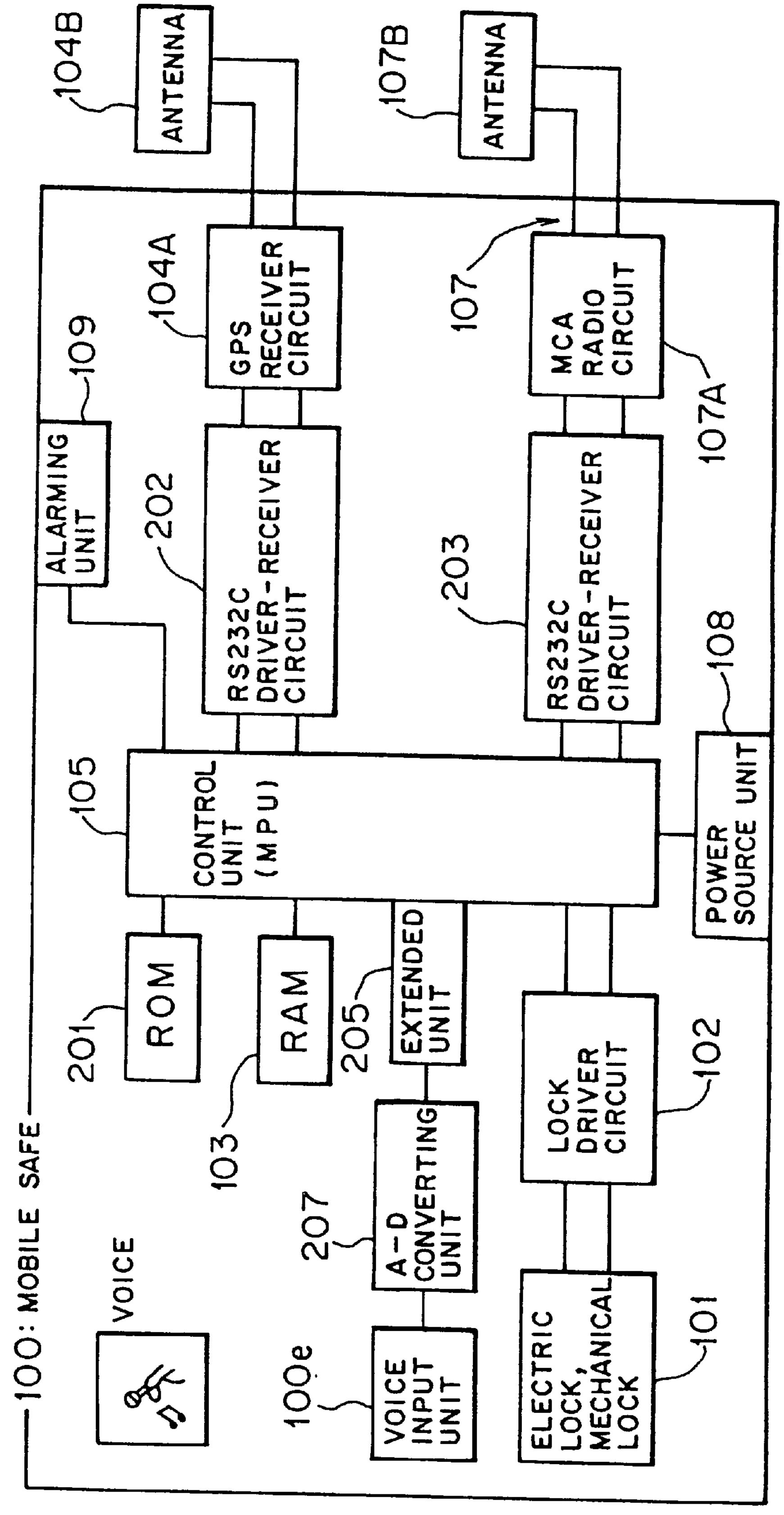

The voice input unit (a voice input apparatus) 100*e* shown in FIG. 18 picks up a voice of an unlocking operator as the input password information if the password information for collation is voice data of a specific unlocking operator who unlocks the key mechanism 101. The voice input unit 100*e* is configured with, for example, a microphone or the like. The input password information is input to the control unit 105 via an A-D converting unit 207 and the extended unit 205.

Other structural elements (refer to reference numerals 101 through 203) shown in FIGS. 14 through 18 have functions similar to those of the first embodiment having been described with reference to FIG. 9.

The control unit (a password information collating means, an unlock directing means) 105 of the mobile safe 100 collates password information for collation received as the management information from the host apparatus 110 through the radio communicating unit 107 with input password information input through any one of the password information input means 100*a* through 100*e* to determine whether these two sorts of password information are in agreement or not, upon an unlocking operation on the key mechanism 101.

The control unit 105 directs the lock driver circuit 102 to unlock the key mechanism 101 if it is determined that position information of a destination of the transportation agrees with present position information, and the password information for collation agrees with the input password information.

If it is determined that the above password information for collation does not agree with the input password information as a result of a collation by the control unit 105, the control unit 105 controls the alarming unit 109 to generate an alarm, besides controlling the radio communicating unit 107 to transmit abnormal information to the host apparatus 110.

When receiving the abnormal information from the mobile safe 100 through the radio communicating unit 113, the central control unit (a reporting means) 112 of the host apparatus 110 reports an occurrence of an emergency to the department concerned therewith.

Figure 19:
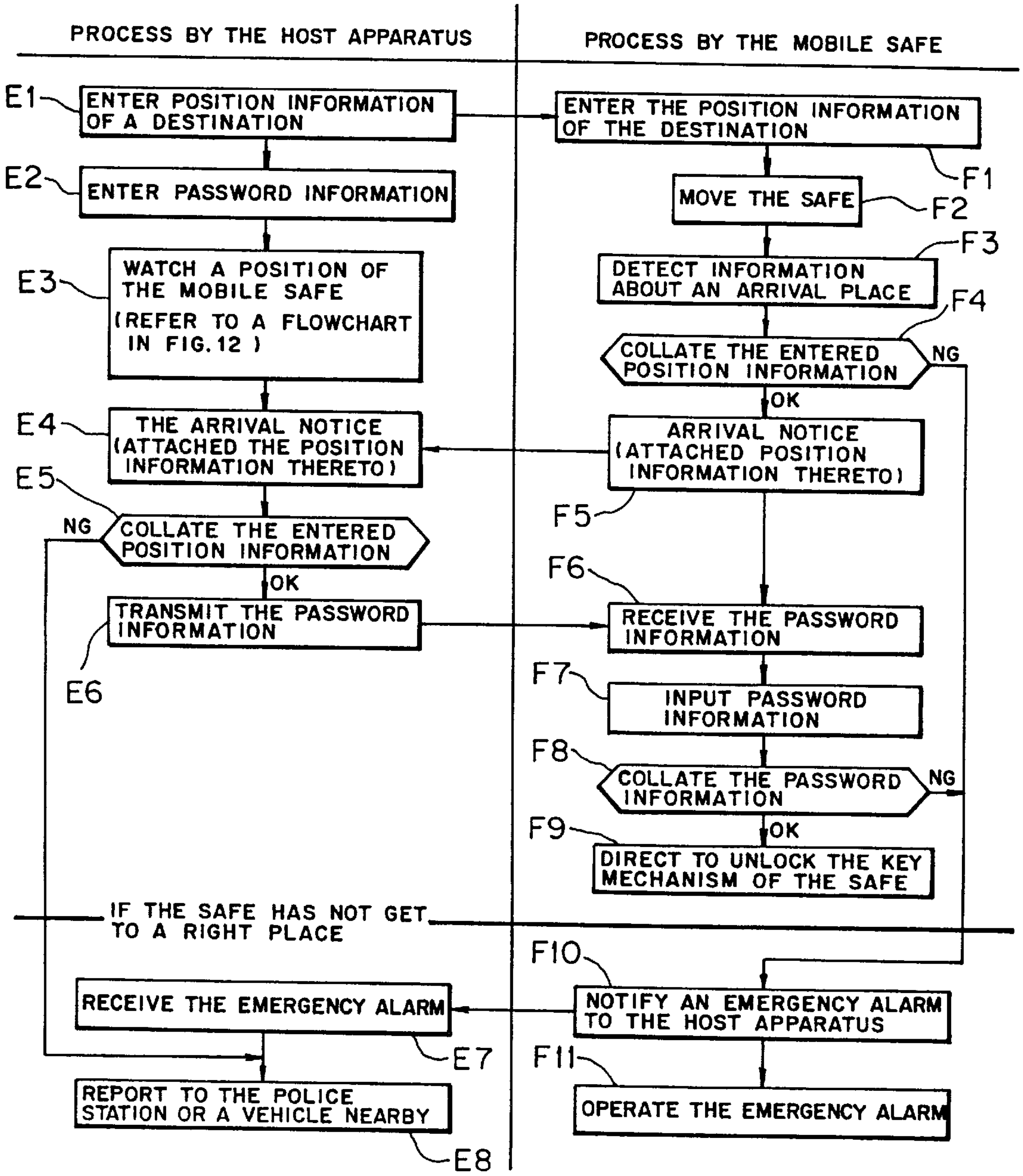
FIG. 19 is a flowchart for illustrating an operation of the third embodiment of this invention.

An operation of the transport container managing system with the above structure according to the third embodiment of this invention will be next described with reference to a flowchart (Step E1 through Step E8, and Step F1 through Step F11) shown in FIG. 19.

In the transport container managing system of this embodiment, password information for collation necessary upon unlocking the key mechanism 101 is entered along with position information of a destination of the transportation, in the central storage unit 111 of the host apparatus 110 when the mobile safe 100 is loaded on the cash transporting vehicle 121 and transported to a predetermined place (Step E1, and Step E2).

The above-mentioned password information for collation is password information used to identify a transporter (a guard) transporting the mobile safe 100. As the password information, there are, for example, password information, and fingerprint information or voice information of the transporter, etc.

The process to grasp a position of the mobile safe 100 during a transportation by the cash transporting vehicle 121 on the side of the host apparatus 110 (Step E3) is performed similarly to the first and the second embodiments (refer to the flowchart in FIG. 12).

More specifically, when the radio communicating unit 113 of the host apparatus 110 receives present position detection information from the mobile safe 100, the central control unit 112 can control the input-output apparatus 114 such as a display to display a present position on a map on the basis of this information.

On the side of the mobile safe 100, the process to enter position information about a destination of the transportation as information used to lock or unlock the key mechanism 101 in the storage unit 103 (Step F1) through the process by the control unit 105 to collate present position information of the mobile safe 100 detected by the position information detecting unit 104 with the position information of the destination of the transportation stored in the storage unit 103 to determine their agreement (Step F4) are performed in the same manner as the first embodiment described above.

If the present position information of the mobile safe 100 does not agree with the position information about the destination of the transportation stored in the storage unit 103 as a result of a collation of the position information by the control unit 105, it is determined that the mobile safe 100 has not arrived at the destination previously entered. The control unit 105 transmits an emergency alarm notice to the radio communicating unit 113 of the host apparatus 110 via the radio communicating unit 107 (from an NG route at Step F4 to Step F10), and operates an emergency alarm in the alarming unit 109 (Step F11).

When the host apparatus 110 receives the emergency alarm notice from the radio communicating unit 107 (Step E7), an occurrence of an emergency is notified to the department concerned therewith such as a police station or a vehicle nearby on a radio or a telephone under a control of the reporting unit 114 (Step E8).

If the present position information of the mobile safe 100 agrees with the position information of the destination of the transportation stored in the storage unit 103 as a result of a determination on an agreement by the control unit 105 (an OK route at Step F4), destination arrival information, which is attached to present position information, is notified to the host apparatus 110 through the radio communicating unit 107 (Step F5).

When the radio communicating unit 113 of the host apparatus 110 receives the destination arrival information, which is attached to the present position information, from the mobile safe 100 (Step E4), the central control unit 112 also collates the present position information with the position information of the destination of the transportation stored as the management data in the central storage unit 111 to determine whether these two sorts of position information are in agreement or not (Step E5).

If it is determined that these two sorts of position information are in agreement as a result of the collation of the above position information (an OK route at Step E5), the central control unit 112 determines that the mobile safe 100 has arrived at the destination previously entered, and transmits password information for collation necessary to unlock the key mechanism 101 as the management information from the radio communicating unit 113 (Step E6). If it is determined that the two sorts of position information are not in agreement, the central control unit 112 reports an occurrence of an emergency to the department concerned therewith such as a police station or a vehicle nearby on a radio or a telephone (Step E8).

This double position collating process performed on both sides of the mobile safe 100 and the host apparatus 110 may increase the reliability of the determination of the position collation.

If the above two sorts of position information agree with each other, the control unit 105 of the mobile safe 100 receives the password information for collation as the management information from the above host apparatus 110 via the radio communicating unit 107 (Step F6). A specific unlocking operator who unlocks the key mechanism 101 inputs input password information through any one of the password information input unit 100*a* through 100*e* (Step F7).

The control unit 105 collates the password information for collation from the above host apparatus 110 with the input password information fed through any one of the password information input means 100*a* through 100*e,* and determines whether these two sorts of password information agree with each other or not (Step F8).

If these two sorts of password information are in agreement, in other words, if it is determined that the password information for collation agrees with the input password information, the control unit 105 directs the lock driver circuit 102 to unlock the key mechanism 101 (from an OK route at Step F8 to Step F9).

After a transportation of the mobile safe 100 starts, only a specific unlocking operator can unlock the key mechanism 101 at the destination on condition of an agreement of the position information and an agreement of the password information.

If it is determined that these two sorts of information are not in agreement as a result of a collation of password information in the above control unit 105, the control unit 105 transmits abnormal information to the host apparatus 110 from the radio communicating unit 107 (from a NO route at Step F8 to Step F10) like the above case in which the above two sorts of position information are not in agreement (an NG route at Step F4), and controls the alarming unit 109 to generate an alarm (Step F11).

When the central control unit 112 of the host apparatus 110 receives the abnormal information from the mobile safe 100 through the radio communicating unit 113 (Step E7), the central control unit 112 reports an occurrence of an emergency to the department concerned therewith such as to a police station or a vehicle nearby (Step E8).

According to the transport container managing system of the third embodiment of this invention, position information of the transported goods is detected by the position information detecting unit 104, and an unlocking control is performed on condition of an agreement of the position information, similarly to the first and second embodiments described above. If someone fraudulently obtains the transporting vehicle or the case and tries to open the lock, it is possible to prevent the lock from being opened since the lock cannot be opened unless the position information entered in advance agrees with a place where the key mechanism 101 is unlocked. It is therefore possible to improve the security of the transported goods.

This embodiment also has an advantage that it is impossible to unlock the key mechanism 101 of the mobile safe 100 without a receipt of password information from the host apparatus 110. It is therefore possible to ensure the security of the transported goods if the position information detecting unit 104 fails, for example.

The unlocking control is performed on condition that the double position collation on both sides of the mobile safe 100 and the host apparatus 110 results in an agreement and a collation of password information from the host apparatus 110 results in an agreement. This may improve not only the reliability of a determination of the position collation but also the security of the transported goods since the conditions required to unlock the key mechanism 101 are set twice.

Even during transportation, it is possible to determine a position of the mobile safe 100 on the side of the host apparatus 110. If the mobile safe 100 encounters a robbery, it is therefore possible to detect a position of the stolen mobile safe 100.

(d) Description of Fourth Embodiment

A transport container managing system according to this embodiment can be adapted as a security managing system for a cash transporting vehicle 121 upon a transportation of cash by, for example, a banking facility or the like as shown in FIG. 8, similarly to the first to third embodiments described above.

In the transport container managing system of this embodiment, the control unit 105 of the mobile safe 100 does not have a function as a position collating means for determining whether two sorts of position information are in agreement or not, differently from the above second embodiment as compared therewith. Other structural elements are basically the same.

In the transport container managing system of this embodiment, when the mobile safe 100 gets to a destination, the radio communicating unit 107 transmits destination arrival information, which is attached to the present position information detected by the position information detecting unit 104, to the host apparatus 110 without collating the position information of the destination of the transportation on the side of the mobile safe 100.

Figure 20:
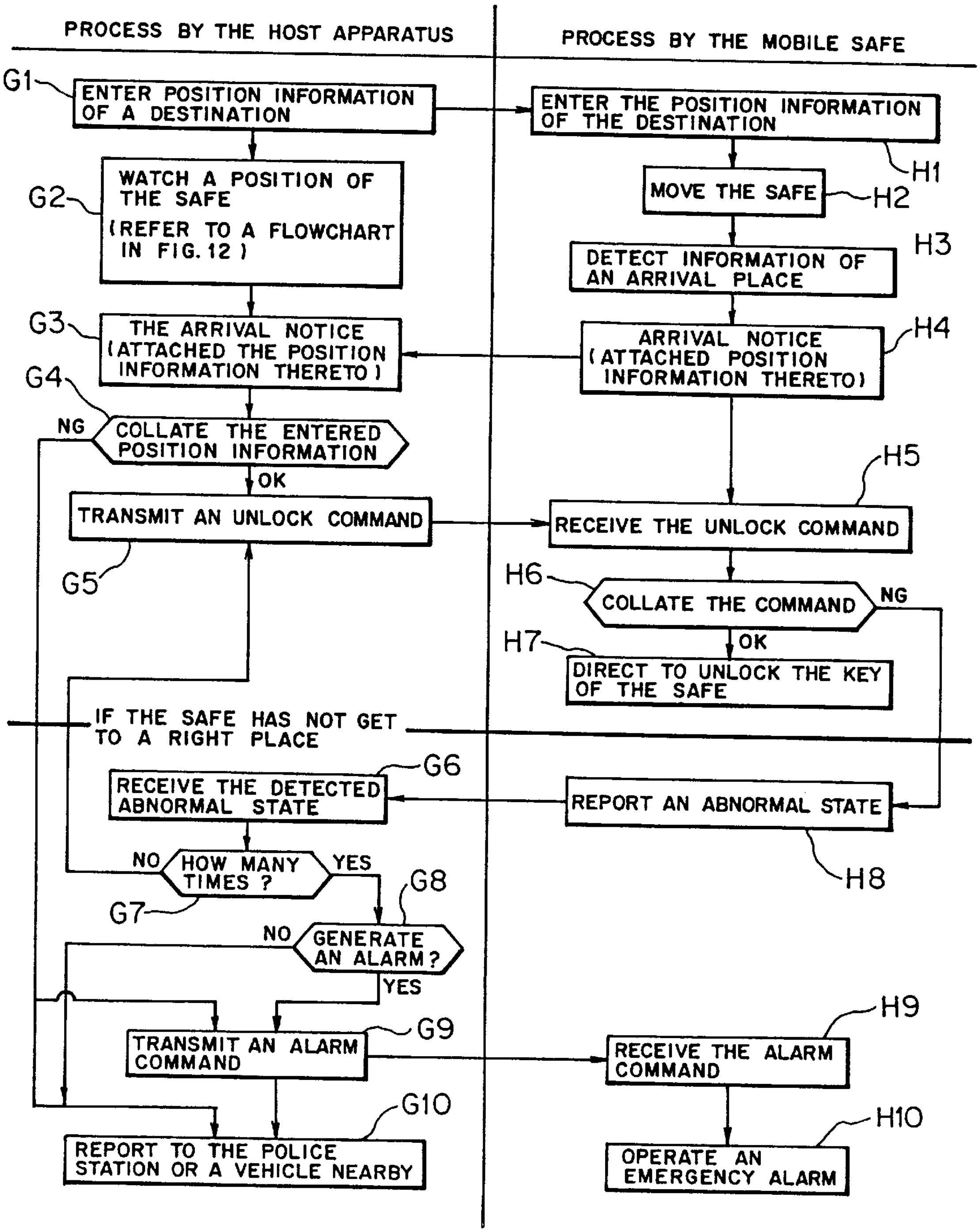
FIG. 20 is a flowchart for illustrating an operation of a fourth embodiment of this invention.

An operation of the transport container managing system with the above structure according to the fourth embodiment of this invention will be next described with reference to a flowchart (Step G1 through Step G10, and Step H1 through Step H10) shown in FIG. 20

According to this embodiment, when the mobile safe 100 gets to a destination, destination arrival information including position information of an arrival place is notified as it is to the host apparatus 110 without a determination as to whether this arrival place is a place having been entered (Step H4). This is a point different from the second embodiment described before. A flow of other processes is basically the same.

According to this embodiment, when the mobile safe 100 is loaded on the cash transporting vehicle 121 and transported to a predetermined place, the process to enter position information of a destination of the transportation in the central storage unit 111 of the host apparatus 110 (Step G1) or the process to determine a position of the mobile safe 100 during a transportation by the cash transporting vehicle 121 on the side of the host apparatus 110 (Step G2) is performed in a manner similar to the first to third embodiments described before.

When the radio communicating unit 113 of the host apparatus 110 receives detected present position information from the mobile safe 100, the central control unit 112 can control the input-output apparatus 114 such as a display to display a present position on a map on the basis of this information (refer to the flowchart in FIG. 12).

After the position information of the destination of the transportation is entered in the storage unit 103 of the mobile safe 100 (Step Hi), the cash transporting vehicle 121 on which the mobile safe 100 is loaded starts for the destination previously entered. The mobile safe 100 is thereby transported to the predetermined place (Step H2). When a transportation by the cash transporting vehicle 121 comes to an end, an unlocking operator inputs that the transportation is over.

When recognizing a termination of the transportation of the mobile safe 100 from an input by the unlocking operator signifying that the transportation is over, the control unit 105 of the mobile safe 100 detects a present position by the position information detecting unit 104 (Step H3). The control unit 105 sends destination arrival information, which is attached to present position information detected by the position information detecting unit 104, to the host apparatus 110 from the radio communicating unit 107 (Step H4).

When the radio communicating unit 113 of the host apparatus 110 receives the destination arrival information, which is attached to the present position information, from the mobile safe 100 (Step G3), the central control unit 112 collates the present position information with the position information of the destination of the transportation stored as management data in the central storage unit 111 to determine whether these two sorts of position information are in agreement or not (Step G4).

Figure 13:
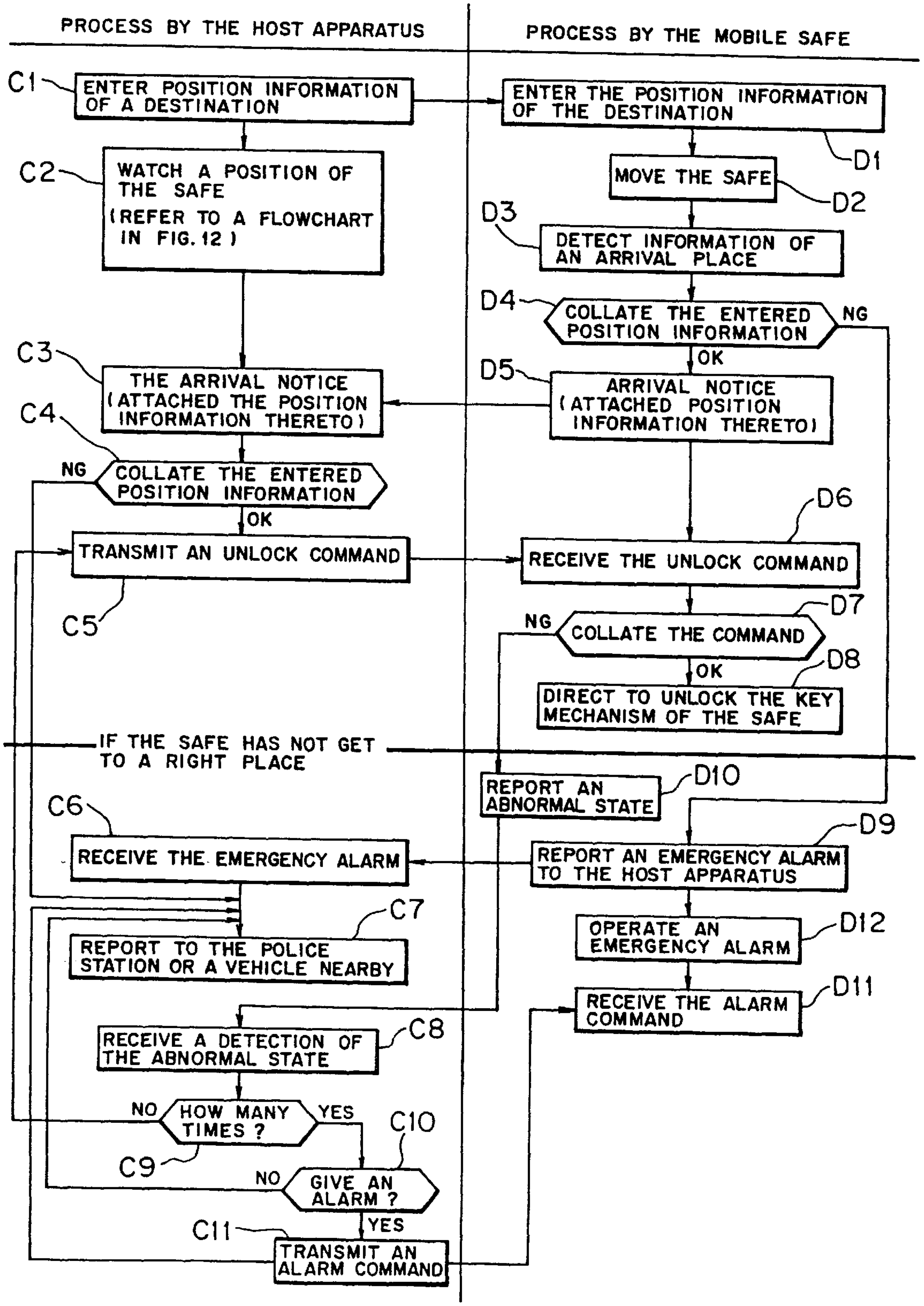
FIG. 13 is a flowchart for illustrating an operation of the second embodiment of this invention.

After that, the processes depending on a result of the determination on the position information by the central control unit 112 (Step G5 through Step G10, and Step H5 through Step H10) are performed in a manner similar to those (refer to Step C5, Step C7 through Step C11, and Step D6 through Step D12 in the flowchart in FIG. 13) according to the above second embodiment.

More specifically, if these two sorts of position information are in agreement as a result of collation of the position information by the central control unit 112 (an OK route at Step G4), it is determined that the mobile safe 100 has arrived at the destination previously entered. The central control unit 112 transmits an unlock command as management information giving a direction to unlock the key mechanism 101 to the mobile safe 100 from the radio communicating unit 113 (Step G5).

When the control unit 105 of the mobile safe 100 receives the unlock command as the management information from the above host apparatus 110 through the radio communicating unit 107 (Step H5), the control unit 105 collates as to whether this unlock command is correct (appropriate) or not (Step H6).

If the control unit 105 determines that this unlock command from the above host apparatus 110 is correct, the control unit 105 directs the key control unit 102 to unlock the key mechanism 101 (Step H7).

If a determination that the above unlock command is not correct, the control unit 105 transmits abnormal information to the host apparatus 110 from the radio communicating unit 107 (from an NG route at Step H6 to Step H8).

If the radio communicating unit 113 of the host apparatus 110 receives the abnormal information from the mobile safe 100 (Step G6), the central control unit 112 counts the number of times of receipt of the abnormal information.

The counted value is compared with a predetermined value (n, for example) stored in the central storage unit 111. If it is determined that the counted value has reached the predetermined value (a YES route at Step G7), it is determined that the mobile safe 100 has not arrived at a correct place.

If an alarm is necessary on the side of the mobile safe 100 in this case, an alarm command to operate an emergency alarm on the side of the mobile safe 100 is transmitted (from a YES route at Step G8 to Step G9). When the radio communicating unit 107 of the mobile safe 100 receives the alarm command (Step H9), an emergency alarm is operated in the alarming unit 109 (Step H10).

If the central control unit 112 determines that the counted value does not exceed the predetermined value (a NO route at Step G7), the central control unit 112 controls the radio communicating unit 113 to transmit again the unlock command giving a direction to unlock the key mechanism 101 as management information to the mobile safe 100 (Step G5).

If the central control unit 112 determines that the counted value has reached a predetermined value (n, for example), and an emergency alarm is operated from the mobile safe 100 itself (a YES route at Step G8), the host apparatus 110 transmits an alarm command to the mobile safe 100, in addition to reporting it to the police station or a vehicle nearby (Step G9, and Step G10). If no alarm is announced from the mobile safe 100 (a NO route at Step G8), only a notice to the police station or a vehicle nearby is made (Step G10).

If it is determined that the counted value has reached the predetermined value, it is possible to report an occurrence of an emergency to the department concerned therewith with or without an alarm command to the mobile safe 100.

According to the transport container managing system of the fourth embodiment of this invention, an unlocking control of the key mechanism 101 is performed on condition that an unlock command from the host apparatus 110 is correct. Accordingly, this embodiment has an advantage that it is possible to manage command information used to unlock the key mechanism 101 for each mobile safe 100.

This embodiment has another advantage that it is possible to ensure the security of the transported goods if the position information detecting unit 104 fails, for example, since the key mechanism 101 of the mobile safe 100 cannot be unlocked without a reception of an unlock command from the host apparatus 110.

Similar to the second embodiment described above, the mobile safe 100 can accept the unlock command from the host apparatus 110 a predetermined number of times. Before the number of times of receipt of the unlock command has reached the predetermined value, it is possible to unlock the key mechanism 101 so long as the unlock command agrees so that an erroneous operation of an emergency alarm by the host apparatus 110 and the alarming unit 109 of the mobile safe 100 can be avoided.

During a transportation, it is possible to determine a position of the mobile safe 100 on the side of the host apparatus 110. If the mobile safe 100 encounters a robbery, it is possible to detect a position of the stolen mobile safe 100.

(f) Description of Fifth Embodiment

A transport container managing system according to this embodiment can be adapted as a security managing system for the cash transporting vehicle 121 upon a transportation of cash by, for example, a banking facility or the like as shown in FIG. 8, like the first to fourth embodiments having been described.

In the transport container managing system of this embodiment, the control unit 105 of the mobile safe 100, differently, does not have a function as a position collating means for determining whether two sorts of position information agree or not, and an emergency alarm of the mobile safe 100 is operated in a different manner, as compared with the above third embodiment. Other structural elements are basically the same.

Figure 21:
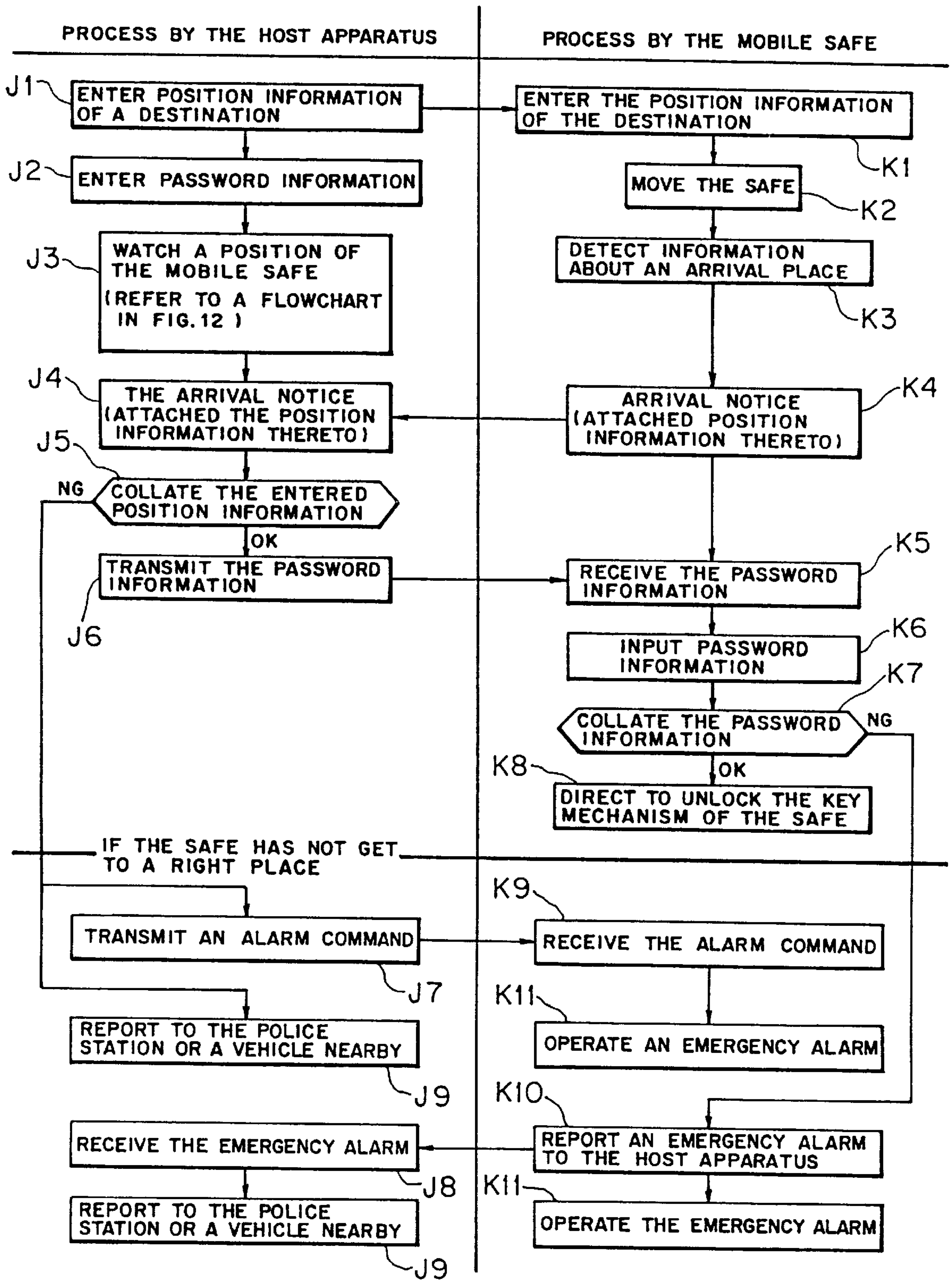
FIG. 21 is a flowchart for illustrating an operation of a fifth embodiment of this invention.

The transport container managing system with the above structure according to the fifth embodiment of this invention operates according to a flowchart (Step J1 through Step J9, and Step K1 through Step K11) shown in FIG. 21.

According to this embodiment, if the mobile safe 100 gets to a destination, destination arrival information including position information of an arrival place is notified to the host apparatus 110 without making a determination whether the arrival place is a place previously entered (Step K4), and if it is determined in the central control unit 112 of the host apparatus 110 that two sorts of position information are not in agreement, an emergency alarm is operated by the alarming unit 109 of the mobile safe 100 (Step J7, Step K9, and Step K10). The above points are different from the third embodiment having been described. A flow of other processes are basically the same.

In the transport container managing system of this embodiment, when the mobile safe 100 is loaded on the cash transporting vehicle 121 to be transported to a predetermined place, password information for collation (password information, fingerprint information or voice information, etc. of the transporter, for example) necessary when the key mechanism 101 is unlocked is entered in the central storage unit 111 of the host apparatus 110 along with position information about a destination (Step E1 and Step E2).

The process to determine a position of the mobile safe 100 during transportation by the cash transporting vehicle 121 on the side of the host apparatus 110 (Step J3) is performed in a manner similar to the first to fourth embodiments having been described (refer to the flowchart in FIG. 12).

When the radio communicating unit 113 of the host apparatus 110 receives detected present position information from the mobile safe 100, the central control unit 112 can control the input-output apparatus 114 such as a display to display the present position on a map on the basis of this information.

After the position information of the destination is entered in the storage unit 103 of the mobile safe 100 (Step K1), the cash transporting vehicle 121 on which the mobile safe 100 is loaded starts for the destination previously entered. The mobile safe 100 is thereby transported to the predetermined place (Step K2). When the transportation by the cash transporting vehicle 121 is over, an unlocking operator inputs an effect that the transportation is over.

When the control unit 105 of the mobile safe 100 recognizes a termination of the transportation of the mobile safe 100 from the input of the effect that the transportation is over by the unlocking operator, the position information detecting unit 104 detects a present position (Step K3), and sends destination arrival information, which is attached to the detected present position information, to the host apparatus 110 from the radio communicating unit 107 (Step K4).

When the radio communicating unit 113 of the host apparatus 110 receives the destination arrival information, which is attached to the present position information, from the mobile safe 100 (Step J4), the central control unit 112 collates the present position information with the position information of the destination having been entered as the management data in the central storage unit 111 to determine whether these two sorts of position information are in agreement or not (Step J5).

If it is determined that the present position information of the mobile safe 100 agrees with the destination position information stored in the storage unit 113 as a result of a determination on an agreement by the central control unit 112 (an OK route at Step J5), it is determined that the mobile safe 100 has arrived at the destination previously entered. The radio communicating unit 113 transmits password information for collation necessary to unlock the key mechanism 101 as management information (Step J6).

If the two sorts of position information are not in agreement, the central control unit 112 transmits an alarm command directing an alarming operation as the management information to the mobile safe 100 from the radio communicating unit 113 (Step J7), and in addition an occurrence of an emergency is sent to a police station as the department concerned therewith or to a vehicle nearby on a radio or a telephone (Step J9).

If the radio communicating unit 107 of the mobile safe 100 receives the alarm command from the radio communicating unit 113 (Step K10), an emergency alarm is operated by the alarming unit 109 in the mobile safe 100 (Step K11).

If the two sorts of position information are in agreement, the central control unit 112 transmits password information for collation as the management information necessary to unlock the key mechanism 101 to the mobile safe 100 through the radio communicating unit 113 (Step J6).

When the control unit 105 of the mobile safe 100 receives the password information for collation from the host apparatus 110 through the radio communicating unit 107 (Step K5), a specific unlocking operator who unlocks the key mechanism 101 inputs input password information through any one of the password information input means 100*a* through 100*e* (Step K6).

The control unit 105 collates the password information for collation from the above host apparatus 110 with the input password information from any one of the password information input means 100*a* through 100*e* to determine whether these two sorts of password information are in agreement or not (Step K7).

If these two sorts of password information agree with each other, in other words, if it is determined that the password information for collation agrees with the input password information, the control unit 105 directs the lock driving circuit 102 to unlock the key mechanism 101 (from an OK route at Step K7 to Step K8).

After transportation of the mobile safe 100 starts, only a specific unlocking operator can unlock the key mechanism 101 at the destination on condition of an agreement of the position information and an agreement of the password information.

If it is determined that the two sorts of information are not in agreement as a result of a collation of the password information in the control unit 105, the control unit 105 transmits an emergency alarm to the host apparatus 110 through the radio communicating unit 107 (Step K10), in addition to controlling the alarming unit 109 to generate an emergency alarm (Step J11).

If the host apparatus 110 receives an emergency alarm from the mobile safe 100 through the radio communicating unit 113 (Step J8), the central control unit 112 notifies an occurrence of an emergency to a police station as the department concerned therewith or to a vehicle nearby (Step J9).

According to the transport container managing system of the fifth embodiment of this invention, the unlocking control for the key mechanism 101 is performed on condition that a collation of the password information entered in advance with the password information input from the mobile safe 100 results in an agreement. The fifth embodiment of this invention has an advantage that it is possible to manage password information used to unlock the key mechanism 101 for each mobile safe 100.

Without a receipt of the password information from the host apparatus 110, the key mechanism 101 of the mobile safe 100 cannot be unlocked. Even if the position information detecting unit 104 fails, it is possible to ensure the security of the transported goods.

During a transportation, the host apparatus 110 can determine a position of the mobile safe 100. If the mobile safe 100 encounters a robbery, it is possible to detect a position of the stolen mobile safe 100.

(g) Others

In each of the above embodiments, there is provided the position information detecting unit 104 to perform an unlocking control on condition that two sorts of position information are in agreement. This invention is, however, not limited to this manner. It is possible that the mobile safe 100 receives an unlock command or password information from the host apparatus 110, collates the unlock command or the password information, and performs the unlocking control on condition only that the collation results in an agreement. This manner is also effective to ensure the security of the transported goods, besides omitting entry of position information about a destination in advance.

Figure 22:
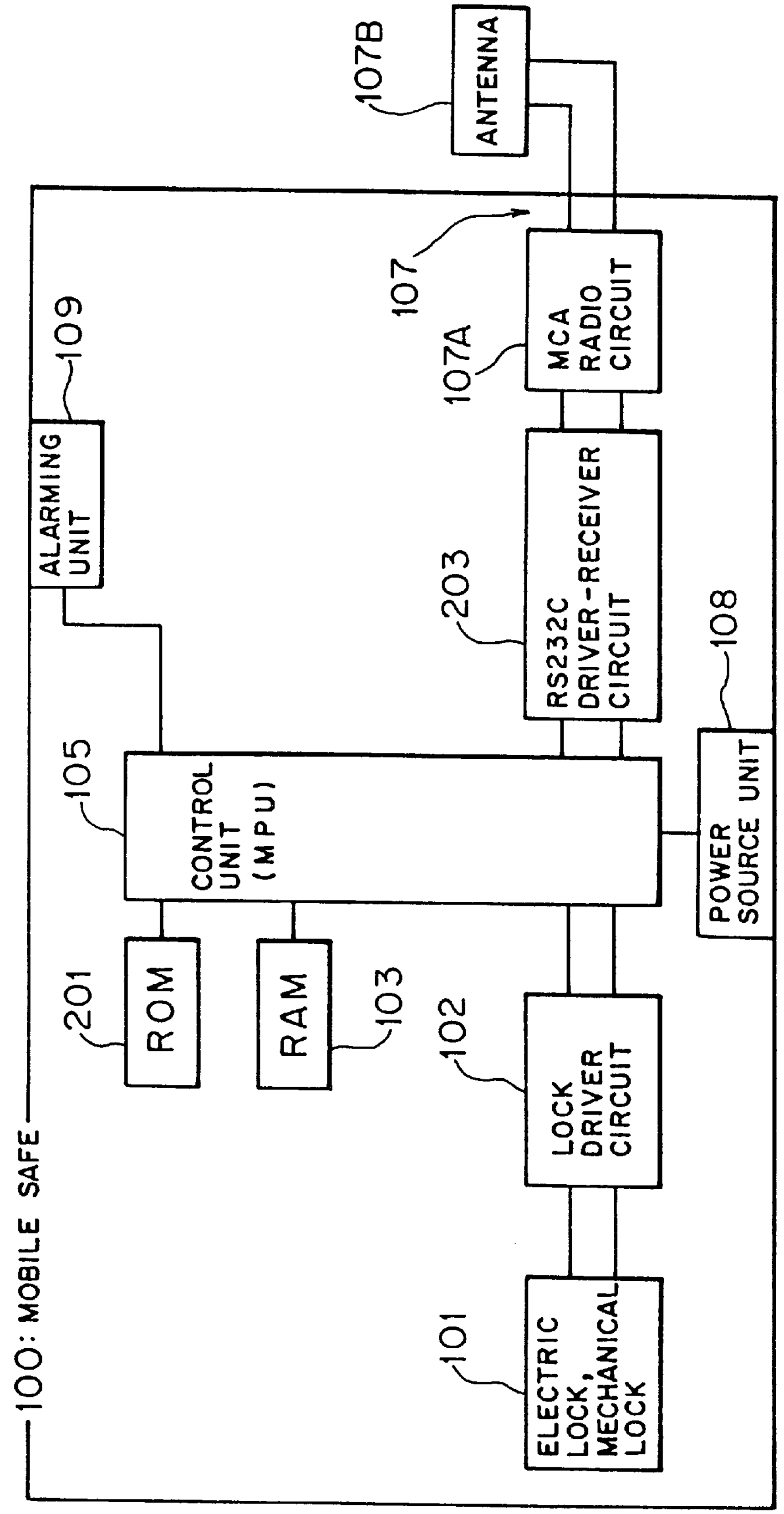
FIGS. 22 and 23 are block diagrams showing hardware structures of mobile safes according to other embodiments of this invention.
Figure 23:
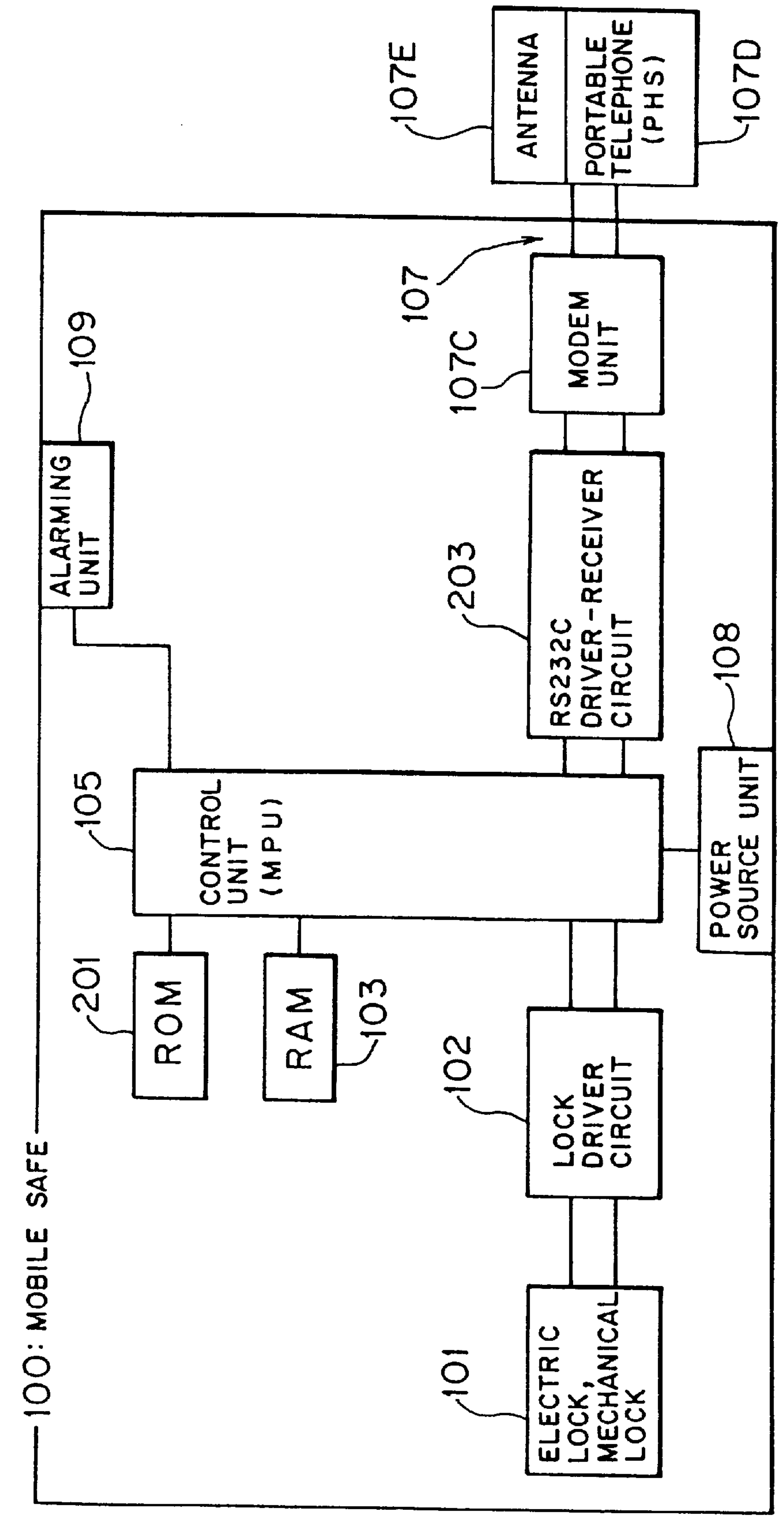

In the above case, the radio communicating unit 107 of the mobile safe 100 may be configured, as hardware, with an MCA radio circuit 107A and the antenna 107B, as shown in FIG. 22. Alternatively, the radio communicating unit 107 may be configured with a modem 107C, a portable telephone 107D and an antenna 107E, as shown in FIG. 23.

The above embodiments have been described by way of examples where the mobile safe 100 loaded on the cash transporting vehicle 121 is used as a transport container. This invention is, however, not limited to these examples. This invention can be adapted, for example, as a system for remotely managing goods loaded on a delivery service vehicle in a transporting business such as a delivery service. In this case, this invention may provide the same advantages as the above embodiments, as a matter of course.

What is claimed is:

1. A transport container closed in a condition where goods are housed therein and locked by a key mechanism upon transportation comprising:

- a key driving means for switching a lock/unlock condition of said key mechanism by driving said key mechanism;
- a storage means for storing in advance position information about a destination of the transportation where said key mechanism is unlocked;
- a position detecting means for detecting a present position;
- a position collating means for collating said position information about the destination of the transportation stored in said storage means with present position information detected by said position detecting means to determine whether these two position information are in agreement upon an operation to unlock said key mechanism; and
- an unlock directing means for directing said key driving means to switch said key mechanism to the unlock condition if said position collating means determines that the position information about the destination of the transportation agrees with said present position information.

2. The transport container according to claim 1 further comprising:

- a transmitting means for transmitting destination arrival information attached to said present position information, to a host apparatus if said position collating means determines that the position information about the destination of the transportation agrees with said present position information.

3. The transport container according to claim 1 further comprising:

- an alarming means for generating an alarm if said position collating means determines that the position information about the destination of the transportation disagrees with said present position information.

4. The transport container according to claim 1 further comprising:

- a transmitting means for transmitting alarm information to a host apparatus if said position collating means determines that the position information about the destination of the transportation disagrees with said present position information.

5. The transport container according to claim 1 further comprising:

a receiving means for receiving said position information about the destination of the transportation from a host apparatus before a start of the transportation;

said position information about the destination of the transportation from said host apparatus received by said receiving means is entered and stored in said storage means.

6. The transport container according to claim 1 further comprising:

a receiving means for receiving an unlock command giving a direction to unlock said key mechanism from a host apparatus upon an operation to unlock said key mechanism; and an unlock command collating means for determining whether the unlock command from said host apparatus received by said receiving means is correct;

said unlock directing means directing said key driving means to switch said key mechanism to the unlock condition if said position collating means determines that said position information about the destination of the transportation agrees with said present position information and said unlock command collating means determines that said unlock command is correct.

7. The transport container according to claim 6 further comprising:

a transmitting means for transmitting abnormal information to said host apparatus if said unlock command collating means determines that said unlock command is incorrect.

8. The transport container according to claim 1 further comprising:

a receiving means for receiving password information for collation necessary when said key mechanism is unlocked from a host apparatus;

a password information input means for inputting password information for unlocking said key mechanism; and a password information collating means for collating said password information for collation received by said receiving means with input password information input through said password information input means to determine whether these two password information are in agreement upon an operation to unlock said key mechanism;

said unlock directing means directing said key driving means to switch said key mechanism to the unlock condition if said position collating means determines that said position information about the destination of the transportation agrees with said present position information, and said password information collating means determines that said password information for collation agrees with said input password information.

9. The transport container according to claim 8 further comprising:

an alarming means for generating an alarm if said password information collating means determines that said password information for collation disagrees with said input password information.

10. The transport container according to claim 8 further comprising:

a transmitting means for transmitting alarm information to said host apparatus if said password information collating means determines that said password information for collation disagrees with said input password information.

11. The transport container according to claim 8, wherein said password information for collation is a specific password, and said password information input means is a pin pad operated to input the password as said input password information.

12. The transport container according to claim 8, wherein said password information for collation is a specific password, and said password information input means is a magnetic card reader for reading said password information as said input password information from a magnetic card in which said password information is stored in advance.

13. The transport container according to claim 8, wherein said password information for collation is a specific password, and said password information input means is an IC card reader for reading said password information as said input password information from an IC card in which said password information is stored in advance.

14. The transport container according to claim 8, wherein said password information for collation is fingerprint data of a specific unlocking operator who unlocks said key mechanism, and said password information input means is a fingerprint reading apparatus for reading a fingerprint of the unlocking operator as said input password information.

15. The transport container according to claim 8, wherein said password information for collating is fingerprint data of a specific unlocking operator who unlocks said key mechanism, and said password information input means is an IC card reader for reading said fingerprint data as said input password information from an IC card in which the fingerprint data of the unlocking operator is stored in advance.

16. The transport container according to claim 8, wherein said password information for collation is voice data of a specific unlocking operator who unlocks said key mechanism, and said password information input means is a voice input apparatus for picking up a voice of the unlocking operator as said input password information.

17. The transport container according to claim 8, wherein said password information for collation is voice data of a specific unlocking operator who unlocks said key mechanism, and said password information input means is an IC card reader for reading said voice data as said input password information from an IC card in which the voice data of the unlocking operator is stored in advance.

18. A transport container managing system having a transport container closed when goods are housed therein and locked by a key mechanism upon transportation and a host apparatus for managing said transport container comprising:

said transport container comprising;

a receiving means for receiving management information from said host apparatus;

a transmitting means for transmitting information about said transport container to said host apparatus;

a key driving means for switching a lock/unlock condition of said key mechanism by driving said key mechanism;

a storage means for storing, in advance, position information about a destination of said transport container where said key mechanism is unlocked;

a position detecting means for detecting a present position of said transport container;

a position collating means for collating said position information about the destination stored in said storage means with present position information detected by said position detecting means upon an operation to unlock said key mechanism to determine whether these two position information are in agreement;

an unlock directing means for directing said key driving means to switch said key mechanism to the unlock condition if said position collating means determines that said position information about the destination agrees with said present position information;

said host apparatus comprising;

a central storage means for storing management data for said transport container;

a transmitting means on a side of said host apparatus for transmitting management information for managing said transport container to said transport container; and a receiving means on the side of said host apparatus for receiving information about said transport container from said transport container;

before transportation of said transport container starts, said transmitting means on the side of said host apparatus transmitting said position information about the destination stored as said management data in said central storage means to said transport container as said management information;

in said transport container, said position information about the destination received as said management information from said host apparatus by said receiving means being entered and stored in said storage means of said transport container;

in said transport container, said transmitting means transmitting destination arrival information, which is attached to said present position information, to said host apparatus upon an operation to unlock said key mechanism if said position collating means determines that said position information about the destination agrees with said present position information.

19. The transport container managing system according to claim 18, wherein said transport container further comprising:

an alarming means for generating an alarm if said position collating means determines that said position information about the destination of the transportation disagrees with said present position information.

20. The transport container managing system according to claim 18, wherein in said transport container, said transmitting means transmits alarm information to said host apparatus if said position collating means determines that said position information of the destination of the transportation disagrees with said present position information; and said host apparatus further comprises a reporting means for reporting an emergency to a department concerned therewith when said receiving means, on the side of said host apparatus, receives said alarm information from said transport container.

21. The transport container managing system according to claim 18, wherein said host apparatus further comprises a position collating means, on the side of said host apparatus, for collating said present position information, which is attached to said destination arrival information received from said transport container by said receiving means on the side of said host apparatus, with said position information about the destination stored as said management data in said central storage means to determine whether these two position information are in agreement;

if said position collating means on the side of said host apparatus determines that said present position information agrees with said position information about the destination, said transmitting means on the side of said host apparatus transmits an unlock command giving a direction to unlock said key mechanism of said transport container as said management information to said transport container;

said transport container further comprises an unlock command collating means for determining whether said unlock command received as said management information from said host apparatus by said receiving means on the side of said host apparatus is correct;

if said position collating means determines that said position information about the destination agrees with said present position information, and said unlock command collating means determines that said unlock command is correct, said unlock directing means directing said key driving means to unlock said key mechanism.

22. The transport container managing system according to claim 21, wherein in said transport container, if said unlock command collating means determines that said unlock command is incorrect, said transmitting means transmits abnormal information to said host apparatus;

said host apparatus further comprises a counting means for counting the number of times of receipt of said abnormal information from said transport container by said receiving means on the side of said host apparatus, a comparing means for comparing a counted value obtained by said counting means with a predetermined value, and a reporting means for reporting an emergency to a department concerned therewith if said comparing means determines that said counted value has reached said predetermined value;

if said comparing means determines that said counted value is below said predetermined value, said transmitting means on the side of said host apparatus transmits again the unlock command giving a direction to unlock said key mechanism as said management information to said transport container.

23. The transport container managing system according to claim 22, wherein in said host apparatus, if said comparing means determines that said counted value has reached said predetermined value, said transmitting means on the side of said host apparatus transmits an alarm command directing an alarming operation as said management information to said transport container;

said transport container further comprises an alarming means for generating an alarm if said receiving means receives said alarm command as said management information from said host apparatus.

24. The transport container managing system according to claim 18, wherein said host apparatus further comprises a position collating means, on the side of said host apparatus, for collating said present position information, which is attached to said destination arrival information received from said transport container by said receiving means on the side of said host apparatus, with said position information about the destination stored as said management data in said central storage means to determine whether these two position information are in agreement;

if said position collating means on the side of said host apparatus determines that said present position information agrees with said position information about the destination, said transmitting means on the side of said host apparatus transmits password information for collation necessary when said key mechanism of said transport container is unlocked as said management information to said transport container;

said transport container further comprises;

a password information input means for inputting password information for unlocking said key mechanism; and a password information collating means for collating said password information for collation which is received as said management information from said host apparatus by said receiving means, with input password information input through said password information input means upon an operation to unlock said key mechanism to determine whether these two password information are in agreement;

if said position collating means determines that said position information about the destination agrees with said present position information and said password information collating means determines that said password information for collation agrees with said input password information, said unlock directing means directs said key driving means to switch said key mechanism to the unlock condition.

25. The transport container managing system according to claim 24, wherein said transport container further comprises an alarming means for generating an alarm if said password information collating means determines that said password information for collation disagrees with said input password information.

26. The transport container managing system according to claim 25, wherein in said transport container, if said password information collating means determines that said password information for collation disagrees with said input password information, said transmitting means transmits abnormal information to said host apparatus;

said host apparatus further comprises a reporting means for reporting an emergency to a department concerned therewith when said receiving means on the side of said host apparatus receives said alarm information from said transport container.

27. A transport container managing system having a transport container closed when goods are housed therein and locked by a key mechanism upon transportation and a host apparatus for managing said transport container comprising:

said transport container comprising:

a receiving means for receiving management information from said host apparatus;

a transmitting means for transmitting information about said transport container to said host apparatus;

a key driving means for switching a lock/unlock condition of said key mechanism by driving said key mechanism;

a position detecting means for detecting a present position of said transport container;

an unlock command collating means for determining whether an unlock command is correct when said receiving means receives the unlock command giving a direction to unlock said key mechanism from said host apparatus;

an unlock directing means for directing said key driving means to switch said key mechanism to the unlock condition if said unlock command collating means determines that said unlock command is correct;

when said transport container arrives at a destination, said transmitting means transmitting destination arrival information which is attached to said present position information detected by said position detecting means, to said host apparatus;

said host apparatus comprising:

a central storage means for storing management data about said transport container;

a transmitting means on the side of said host apparatus for transmitting management information for managing said transport container to said transport container;

a receiving means on the side of said host apparatus for receiving information about said transport container from said transport container; and a position collating means on the side of said host apparatus for collating said present position information which is attached to said destination arrival information received from said transport container by said receiving means on the side of said host apparatus, with said position information about the destination stored as said management data in said central storage means to determine whether these two position information are in agreement;

if said position collating means on the side of said host apparatus determines that said present position information agrees with said position information about the destination, said transmitting means on the side of said host apparatus transmitting an unlock command giving a direction to unlock said key mechanism of said transport container as said management information to said transport container.

28. The transport container system according to claim 27, wherein in said transport container, if said unlock command collating means determines that said unlock command is incorrect, said transmitting means transmits abnormal information to said host apparatus;

said host apparatus further comprises a counting means for counting a number of times of receipt of said abnormal information from said transport container by said receiving means on the side of said host apparatus, a comparing means for comparing a counted value obtained by said counting means with a predetermined value, and a reporting means for reporting an emergency to a department concerned therewith if said comparing means determines that said counted value has reached said predetermined value;

if said comparing means determines that said counted value is below said predetermined value, said transmitting means on the side of said host apparatus transmits again the unlock command giving a direction to unlock said key mechanism as said management information to said transport container.

29. The transport container managing system according to claim 28, wherein in said host apparatus, if said comparing means determines that said counted value has reached said predetermined value, said transmitting means on the side of said host apparatus transmits an alarm command directing an alarming operation as said management information to said transport container;

said transport container further comprises an alarming means for generating an alarm if said receiving means receives said alarm command as said management information from said host apparatus.

30. A transport container managing system having a transport container closed when goods are housed therein and locked by a key mechanism upon transportation and a host apparatus for managing said transport container comprising:

said transport container comprising:

a receiving means for receiving management information from said host apparatus;

transmitting means for transmitting information about said transport container to said host apparatus;

a key driving means for switching a lock/unlock condition of said key mechanism by driving said key mechanism;

a position detecting means for detecting a present position of said transport container;

a password information input means for inputting password information for unlocking said key mechanism;

a password information collating means for collating password information for collation with input password information input from said password information input means when said receiving means receives said password information for collation necessary when said key mechanism is unlocked from said host apparatus to determine whether these two password information are in agreement;

an unlock directing means for directing said key driving means to switch said key mechanism to the unlock condition if said password information collating means determines that said password information for collation agrees with said input password information;

when said transport container arrives at a destination, said transmitting means transmitting destination arrival information, which is attached to said present position information detected by said position detecting means, to said host apparatus;

said host apparatus comprising;

a central storage unit for storing management data about said transport container;

a transmitting means on the side of said host apparatus for transmitting management information for managing said transport container to said transport container;

a receiving means on the side of said host apparatus for receiving information about said transport container from said transport container; and a position collating means on the side of said host apparatus for collating said present position information, which is attached to said destination arrival information which is received from said transport container by said receiving means on the side of said host apparatus, with said position information about the destination stored as the management data in said central storage means to determine whether these two position information are in agreement;

if said position collating means on the side of said host apparatus determines that said present position information agrees with said position information about the destination, said transmitting means on the side of said host apparatus transmitting password information for collation necessary when said key mechanism of said transport container is unlocked as said management information to said transport container.

31. The transport container managing system according to claim 30, wherein said transport container further comprises an alarming means for generating an alarm if said password information collating means determines that said password information for collation disagrees with said input password information.

32. The transport container managing system according to claim 31, wherein in said transport container, if said password information collating means determines that said password information for collation disagrees with said input password information, said transmitting means transmits abnormal information to said host apparatus;

said host apparatus further comprises a reporting means for reporting an emergency to a department concerned therewith when said receiving means on the side of said host apparatus receives said alarm information from said transport container.

33. The transport container managing system according to claim 18, wherein said transmitting means on the side of said host apparatus transmits, on occasion, a position confirm command demanding a transmission of position information about said transport container during transportation as said management information to said transport container;

in said transport container, when said receiving means receives said position confirm command as said management information, said transmitting means transmits present position information about said transport container during transportation which is detected by said position detecting means to said host apparatus.

34. The transport container managing system according to claim 27, wherein said transmitting means on the side of said host apparatus transmits, on occasion, a position confirm command demanding a transmission of position information about said transport container during transportation as said management information to said transport container;

in said transport container, when said receiving means receives said position confirm command as said management information, said transmitting means transmits present position information about said transport container during transportation which is detected by said position detecting means to said host apparatus.

35. The transport container managing system according to claim 24 further comprising an alarming means for generating an alarm if said password information collating means determines that said password information for collation disagrees with said input password information.

36. The transport container managing system according to claim 30 further comprising an alarming means for generating an alarm if said password information collating means determines that said password information for collation disagrees with said input password information.

37. The transport container managing system according to claim 24 further comprising a transmitting means for transmitting alarm information to said host apparatus if said password information collating means determines that said password information for collation disagrees with said input password information.

38. The transport container managing system according to claim 30 further comprising a transmitting means for transmitting alarm information to said host apparatus if said password information collating means determines that said password information for collation disagrees with said input password information.

39. The transport container managing system according to claim 24, wherein said password information for collation is a specific password; and said password information input means is a pin pad operated to input the password as said input password information.

40. The transport container managing system according to claim 30, wherein said password information for collation is a specific password; and said password information input means is a pin pad operated to input the password as said input password information.

41. The transport container managing system according to claim 24 wherein said password information for collation is a specific password, and said password information input means is a magnetic card reader for reading said password information as said input password information from a magnetic card in which said password information is stored in advance.

42. The transport container managing system according to claim 30, wherein said password information for collation is a specific password, and said password information input means is a magnetic card reader for reading said password information as said input password information from a magnetic card in which said password information is stored in advance.

43. The transport container managing system according to claim 24, wherein said password information for collation is a specific password, and said password information input means is an IC card reader for reading said password information as said input password information from an IC card in which said password information is stored in advance.

44. The transport container managing system according to claim 30, wherein said password information for collation is a specific password, and said password information input means is an IC card reader for reading said password information as said input password information from an IC card in which said password information is stored in advance.

45. The transport container managing system according to claim 24, wherein said password information for collation is fingerprint data of a specific unlocking operator who unlocks said key mechanism, and said password information input means is a fingerprint reading apparatus for reading a fingerprint of the unlocking operator as said input password information.

46. The transport container managing system according to claim 30, wherein said password information for collation is fingerprint data of a specific unlocking operator who unlocks said key mechanism, and said password information input means is a fingerprint reading apparatus for reading a fingerprint of the unlocking operator as said input password information.

47. The transport container managing system according to claim 24, wherein said password information for collating is fingerprint data of a specific unlocking operator who unlocks said key mechanism, and said password information input means is an IC card reader for reading said fingerprint data as said input password information from an IC card in which the fingerprint data of the unlocking operator is stored in advance.

48. The transport container managing system according to claim 30, wherein said password information for collating is fingerprint data of a specific unlocking operator who unlocks said key mechanism, and said password information input means is an IC card reader for reading said fingerprint data as said input password information from an IC card in which the fingerprint data of the unlocking operator is stored in advance.

49. The transport container managing system according to claim 24, wherein said password information for collation is voice data of a specific unlocking operator who unlocks said key mechanism, and said password information input means is a voice input apparatus for picking up a voice of the unlocking operator as said input password information.

50. The transport container managing system according to claim 30, wherein said password information for collation is voice data of a specific unlocking operator who unlocks said key mechanism, and said password information input means is a voice input apparatus for picking up a voice of the unlocking operator as said input password information.

51. The transport container managing system according to claim 24, wherein said password information for collation is voice data of a specific unlocking operator who unlocks said key mechanism, and said password information input means is an IC card reader for reading said voice data as said input password information from an IC card in which the voice data of the unlocking operator is stored in advance.

52. The transport container managing system according to claim 30, wherein said password information for collation is voice data of a specific unlocking operator who unlocks said key mechanism, and said password information input means is an IC card reader for reading said voice data as said input password information from an IC card in which the voice data of the unlocking operator is stored in advance.

53. A transport container closed when goods are housed therein and locked by a key mechanism upon transportation comprising:

a key driving means for switching a lock/unlock condition of said key mechanism by driving said key mechanism;

a position detecting means for detecting a present position;

a transmitting means for transmitting present position information detected by said position detecting means to a host apparatus;

a receiving means for receiving an unlock command giving a direction to unlock said key mechanism from said host apparatus after said host apparatus confirms that said transport container is at a position of a destination on the basis of the present position information transmitted from said transmitting means upon an operation to unlock said key mechanism;

an unlock command collating means for determining whether the unlock command from said host apparatus received by said receiving means is correct; and an unlock directing means for directing said key driving means to switch said key mechanism to an unlock condition if said unlock command collating means determines that said unlock command is correct.

54. A transport container closed when goods are housed therein and locked by a key mechanism upon transportation comprising:

a key driving means for switching a lock/unlock condition of said key mechanism by driving said key mechanism;

a position detecting means for detecting a present position;

a transmitting means for transmitting present position information detected by said position detecting means to a host apparatus;

a receiving means for receiving password information for collation necessary when said key mechanism is unlocked from said host apparatus after said host apparatus confirms that said transport container is at a position of a destination on the basis of the present position information transmitted from said transmitting means;

a password information input means for inputting password information for unlocking said key mechanism;

a password information collating means for collating said password information for collation received by said receiving means with said input password information input through said password information input means upon an operation to unlock said key mechanism to determine whether these two password information are in agreement; and an unlock directing means for directing said key driving means to switch said key mechanism to the unlock condition if said password information collating means determines that said password information for collation agrees with said input password information.

55. A transport container closed in a condition where goods are housed therein and locked by a key mechanism upon transportation comprising:

a storage means for storing, in advance, position information about a destination of the transport container where said key mechanism is unlocked;

a position detecting means for detecting a present position;

a position collating means for collating said position information, about the destination of the transport container which is stored in said storage means, with present position information detected by said position detecting means to determine whether these two position information are in agreement upon an operation to unlock said key mechanism; and an alarming means for generating an alarm if said position collating means determines that the position information about the destination of the transport container disagrees with said present position Information.

* * * * *